US010521494B2

United States Patent
Srinivasan et al.

(10) Patent No.: US 10,521,494 B2
(45) Date of Patent: Dec. 31, 2019

(54) CONTENT TO LAYOUT TEMPLATE MAPPING AND TRANSFORMATION

(71) Applicant: Adobe Inc., San Jose, CA (US)

(72) Inventors: Balaji Vasan Srinivasan, Bangalore (IN); Vineet Sharma, Haryana (IN); Varun Syal, Chandigarh (IN); Tanya Goyal, Mumbai (IN); Shubhankar Suman Singh, Visakhapatnam (IN); Cedric Huesler, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 257 days.

(21) Appl. No.: 15/013,809

(22) Filed: Feb. 2, 2016

(65) Prior Publication Data
US 2017/0220587 A1    Aug. 3, 2017

(51) Int. Cl.
| | |
|---|---|
| *G06F 17/00* | (2019.01) |
| *G06F 17/21* | (2006.01) |
| *G06F 17/22* | (2006.01) |
| *G06F 17/24* | (2006.01) |
| *G06F 16/957* | (2019.01) |

(52) U.S. Cl.
CPC ........ *G06F 17/212* (2013.01); *G06F 16/9577* (2019.01); *G06F 17/227* (2013.01); *G06F 17/248* (2013.01)

(58) Field of Classification Search
CPC .......................... G06F 17/30905; G06F 17/212
See application file for complete search history.

(56) References Cited

U.S. PATENT DOCUMENTS

| | | | | |
|---|---|---|---|---|
| 2005/0102628 | A1* | 5/2005 | Salesin | G06F 17/212 715/764 |
| 2005/0108285 | A1* | 5/2005 | Chickering | G06T 11/206 |
| 2005/0268227 | A1* | 12/2005 | Carlson | G06F 17/248 715/223 |
| 2006/0174186 | A1* | 8/2006 | Caro | G06F 17/21 715/229 |

(Continued)

OTHER PUBLICATIONS

"The Grid", https://thegrid.io/—Retrieve on Nov. 16, 2015, 4 pages.

(Continued)

*Primary Examiner* — Andrew T McIntosh
(74) *Attorney, Agent, or Firm* — SBMC

(57) ABSTRACT

Content can be displayed in different manners on different devices (e.g., having different display sizes) using different layout templates. The techniques discussed herein automatically select a layout template for the content for a particular display device, and transform the content to that layout template for display. Generally, the content is categorized into multiple different categories, and the layout template is also categorized into the same categories. For each of the categories, a mapping of part of the content to a layout element of the layout template is selected. A content display for the layout template is generated by porting (and possibly transforming) the parts of the content into the mapped-to element (as indicated by the selected edges) of the layout. In one or more embodiments, the content display can then be displayed or communicated to another device for display.

20 Claims, 12 Drawing Sheets

(56) References Cited

U.S. PATENT DOCUMENTS

| | | | | |
|---|---|---|---|---|
| 2013/0007580 A1* | 1/2013 | Belfiore | ............... | G06F 17/217 |
| | | | | 715/209 |
| 2013/0024757 A1* | 1/2013 | Doll | ..................... | G06F 17/212 |
| | | | | 715/204 |
| 2014/0289614 A1* | 9/2014 | Ayers | ................... | G06F 17/211 |
| | | | | 715/247 |

OTHER PUBLICATIONS

Hurst,"Review of Automatic Document Formatting", Sep. 18, 2009, 10 pages.

Kumar,"Bricolage: Example-Based Retargeting for Web Design", Proc. CHI: the 29th Annual ACM SIGCHI Conference on Human Factors in Computing Systems, May 2011, 10 pages.

* cited by examiner

US 10,521,494 B2

CONTENT TO LAYOUT TEMPLATE MAPPING AND TRANSFORMATION

BACKGROUND

With the evolution of Internet and digital technology, more people are consuming online content on a multitude of environments ranging from desktop computer displays, to mobile device displays, to wearable device displays. In this scenario, an enterprise seeking an online presence needs to be equipped to efficiently engage with their customers across the multiple environments. However, creating content that can engage with a customer is a non-trivial task, and once the content is available, it is equally challenging to deliver the content in the right way based on the environment in which the content is consumed. Transforming the content in the dynamic online world, is a difficult, time consuming, and laborious task.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a content having multiple parts is obtained and a layout template having multiple layout elements is also obtained. Each of the multiple parts is categorized into one of multiple categories, and each of the multiple layout elements is also categorized into one of the multiple categories. A graph is generated mapping with edges, for each category and for at least one of the multiple parts, a content node representing the part of the content to each of multiple layout nodes in the category, each of the multiple layout nodes representing one of the multiple layout elements. A set of edges of the graph is selected for each category, and a content display is generated by porting the multiple parts into the multiple layout elements as indicated by the selected set of edges.

BRIEF DESCRIPTION OF THE DRAWINGS

The detailed description is described with reference to the accompanying figures.

DETAILED DESCRIPTION

Figure 1:
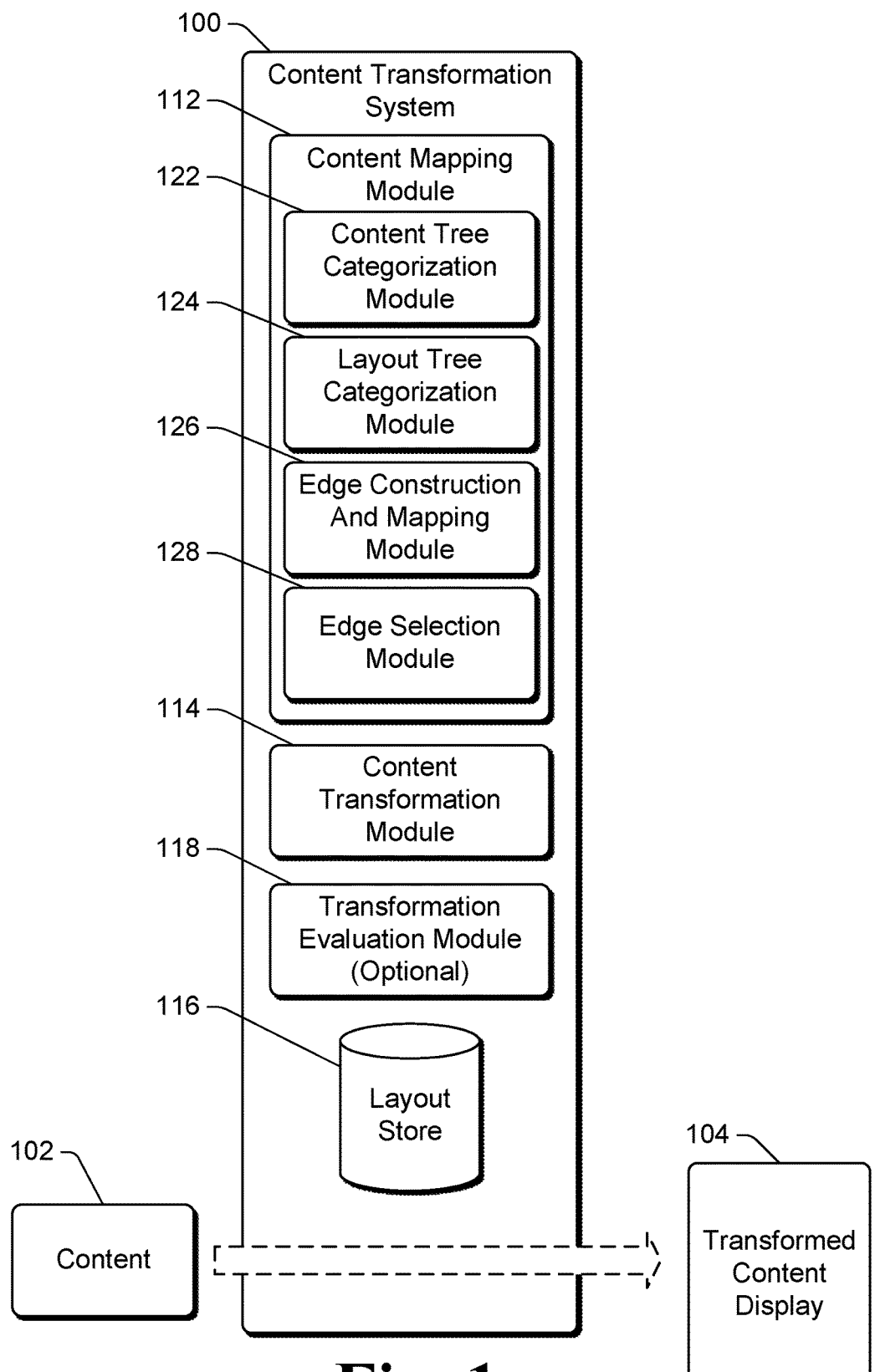
FIG. 1 illustrates an example content transformation system implementing the content to layout template mapping and transformation in accordance with one or more embodiments.

Content to layout template mapping and transformation is discussed herein. Content to be displayed on users' devices is written or maintained as a markup language document, such as a HyperText Markup Language (HTML) document. The content can be displayed on various different types of display devices, ranging from small displays (e.g., wearable devices, smart phones) to large displays (e.g., desktop computers, televisions). Various different layout templates are associated with each of multiple different display devices, each layout template having multiple layout elements of different sizes and types (e.g., for text or images) that are arranged in different locations on a display device when displayed. The techniques discussed herein automatically select a layout template for the content for a particular display device, and transform the content to that layout template for display.

Generally, the techniques discussed herein obtain both content and a layout template. The content is made up of multiple different parts that are each categorized into one of multiple different categories. Each part of the content is a portion of the content that can be categorized into one of the multiple different categories. These categories can vary based on the type of content (e.g., news content, electronic commerce (e-commerce) content, and so forth). For example, for news content, the content is a collection of text, images, and menus that are grouped together into various different categories such as articles, menus, and titles. Some of these categories also include multiple sub-categories. For example, the articles category for news content can include title, image, and text sub-categories.

The layout template is made up of multiple different layout elements, which are portions of the layout template into which parts of the content can be ported for display. Porting a part of the content to a layout element refers to displaying, or including in a content display, the part of the content in the layout element. The porting can including transforming the part of the content, which refers to modifying the part of the content as appropriate (e.g., summarizing the part of the content, resizing the part of the content) so that the content can be displayed in the layout element. The layout elements are also categorized into multiple different categories. The categories (and optionally sub-categories) into which the layout template is categorized are the same categories (and sub-categories) as the content is categorized into.

For each of the categories into which the content parts and the layout elements are mapped, a graph is generated mapping parts of the content to layout elements of the same category. In one or more embodiments, for each category each part of the content that is categorized into that category is treated as a content node, and each layout element that is categorized into that category is treated as a layout node. An edge is then created between each content node of the graph and each layout node of the graph, and a cost associated with the edge is generated. The cost of an edge refers to how well the layout element displays or otherwise represents the content mapped to the layout element. The cost associated with an edge takes into account the ability of the layout element represented by the layout node to take the content part represented by the content node, the loss of information due to content transformation (e.g., due to differences in the size of the content and the display area used by the layout element), and the criticality values of the content node and layout node. The criticality value of a content node refers to the importance of the content represented by the node, and the criticality value of a layout node refers to the importance of content that is to be included in the layout element represented by the node.

Edges of the graph are then selected for each category. The selected edges are, for each category, the set of edges in the graph for the category having the smallest sum of costs (e.g., edges that minimize the cumulative edge costs for the category are selected). A content display is generated by porting the parts of the content into the mapped-to layout elements (as indicated by the selected edges). In one or more embodiments, the content display can then be displayed or communicated to another device for display.

Additionally or alternatively, the process of generating the content display is repeated for the same content for multiple different layout templates. How well the parts of the content are distributed among the layout elements of the different layout templates is evaluated. This evaluation is based on, for example, the loss of information of the content using the layout template, unmapped regions of the layout template (layout elements to which no part of content is ported), and the effect of content transformation (e.g., changes to the content made when porting part of the content to a layout element). Scores for the various layout templates can be generated based on this evaluation and various criteria (e.g., whether it is more important to reduce the loss of information, to reduce the number of unmapped regions of the layout template, or to reduce the effect of content transformation). Given these scores, one of the different layout templates is selected, and the content display generated by transforming the parts of the content into the mapped-to element (as indicated by the selected edges) of the selected layout template is displayed or communicated to another device for display.

Using the techniques discussed herein, the process of rendering the content in appropriate form in accordance with a layout template is automated. An automated system takes the content along with the layout templates describing the layouts in which the content can be delivered and decides the distribution of the content in the layout template and the transformation to be applied on the content to be rightly delivered in the layout template. The techniques discussed herein also provide a mechanism to measure the resulting distribution in order to choose the right layout template from a huge list of layout templates.

The techniques discussed herein provide an automated solution to select a layout template and transform content for display using that layout template, in contrast to techniques in which an enterprise has a team of web designers and developers to put the content from content writers in the appropriate fashion suitable for consumption across multiple devices. The laborious task for designers and editors to map the content appropriately in all the layout templates for targeted devices, especially in light of the increasing number of platforms on which the content is being consumed, is alleviated.

FIG. 1 illustrates an example content transformation system 100 implementing the content to layout template mapping and transformation in accordance with one or more embodiments. The content transformation system 100 receives or otherwise obtains content 102 and generates a transformed content display 104. The content transformation system 100 is a version of the content 102 transformed for display using a particular one of multiple different layout templates for one or more different types of devices.

The content transformation system 100 includes a content mapping module 112, a content transformation module 114, a layout store 116, and optionally a transformation evaluation module 118. The layout store 116 can be implemented using any of a variety of different types of storage devices, such as a magnetic disk, an optical disc, solid state memory (e.g. Flash memory), and so forth. The layout store 116 includes one or more layout templates for each of one or more different types of devices. Each of the layout templates includes layout elements having a different layout (e.g., different sizes, different locations on the display, different numbers of layout elements, combinations thereof). These different types of devices have different characteristics, such as different display (e.g., screen) sizes, different processor or other resource capabilities, and so forth. For example, these different types of devices can be wearable devices (e.g., smart watches or eyeglasses), mobile devices (e.g., smartphones or phablets), hybrid application devices (e.g., mobile devices running applications designed for use on mobile devices as well as devices with larger displays), tablet devices, desktop devices, and so forth.

The content 102 includes multiple parts, such as a title, text (e.g., one or more paragraphs or lists), images, videos, menus, and so forth. Each layout template in the layout store 116 indicates a particular manner in which the different parts of the content 102 are to be displayed on a display, including locations where the parts are to be displayed, which parts are to be displayed, and so forth.

Figure 2A:
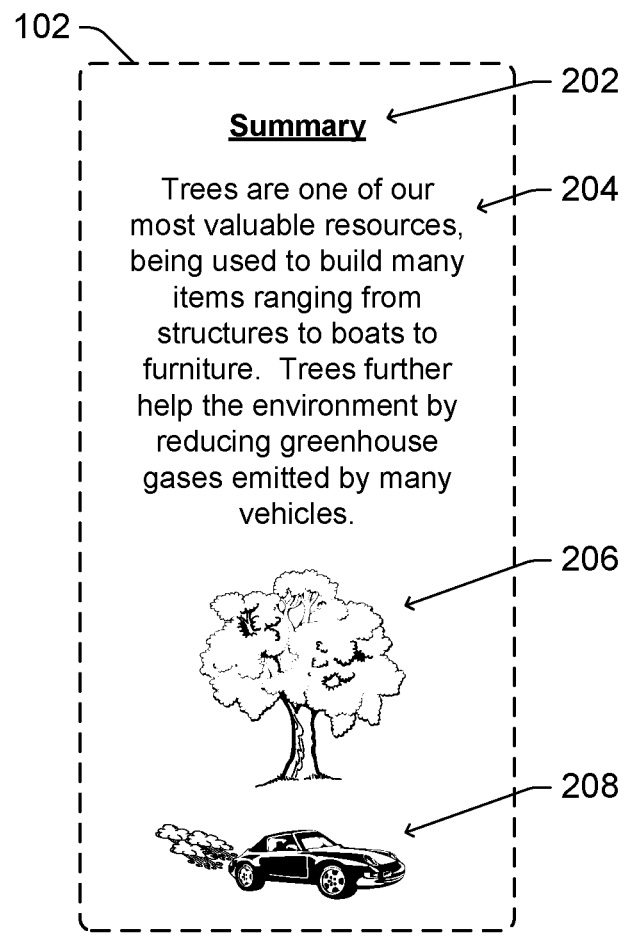
FIGS. 2A, 2B, and 2C illustrate an example of content mappings and transformations that can be performed by the content transformation system.
Figure 2B:
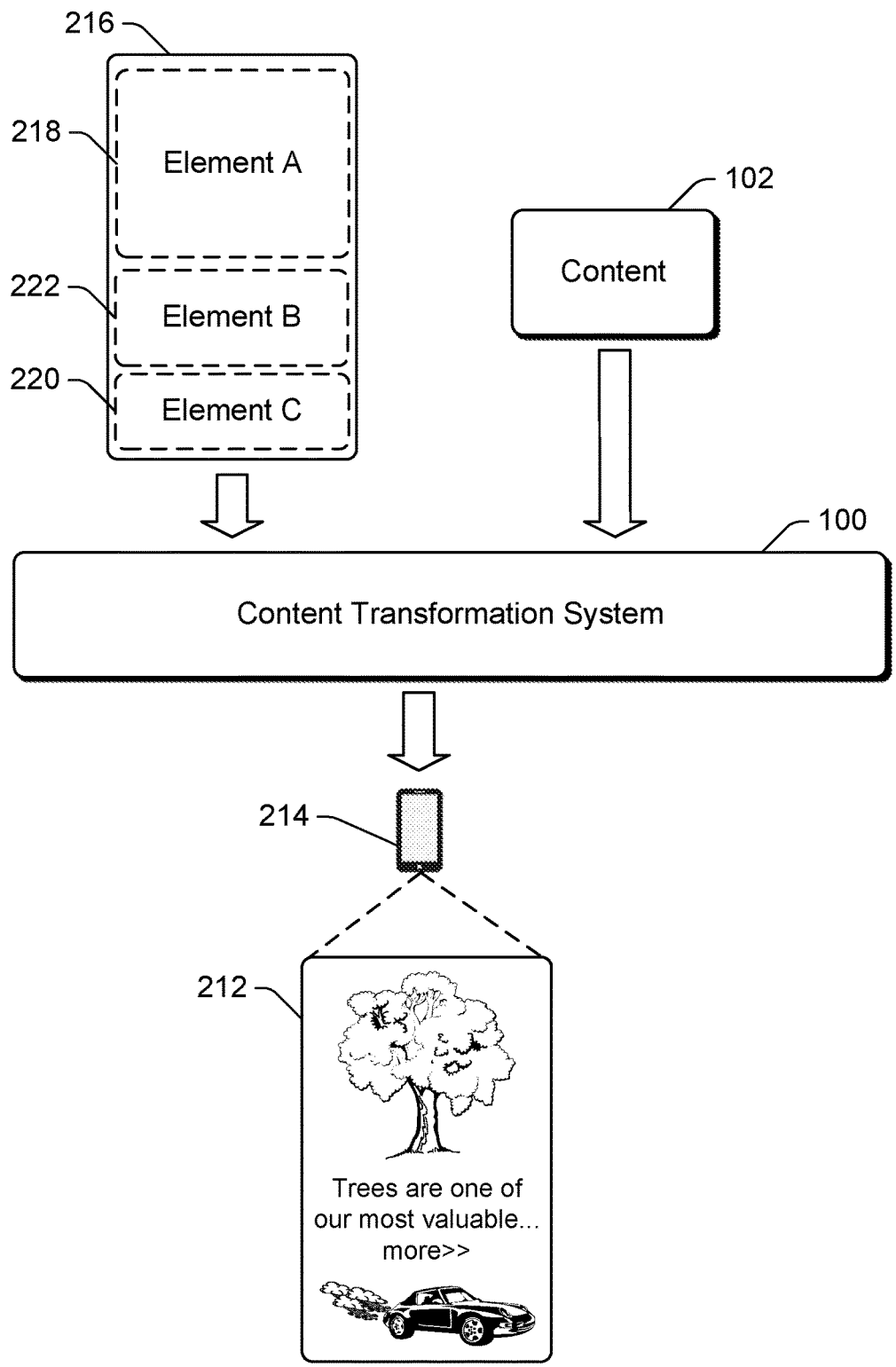
Figure 2C:
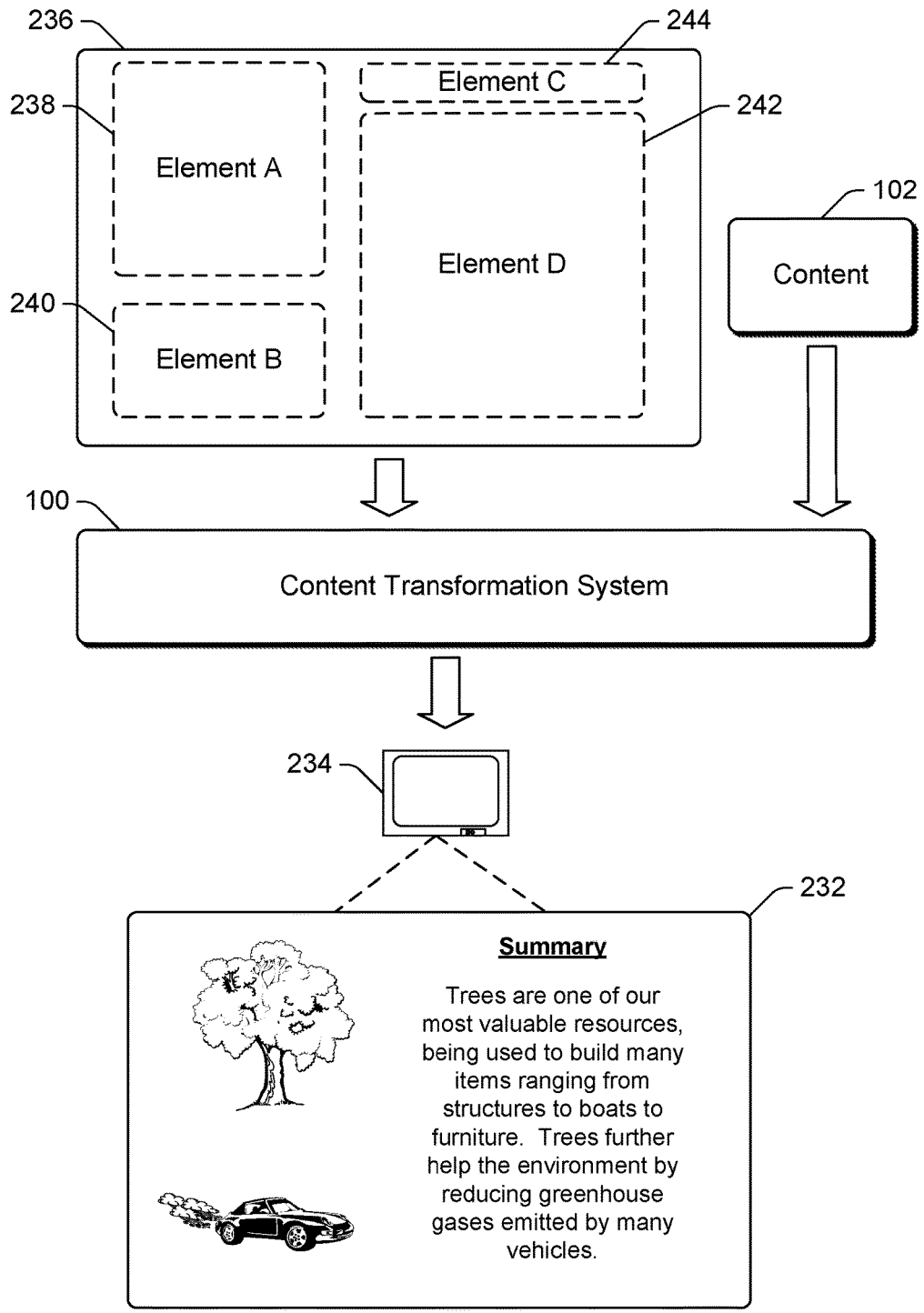

FIGS. 2A, 2B, and 2C illustrate an example of content mappings and transformations that can be performed by the content transformation system 100. FIG. 2A illustrates an example of the content 102. The content 102 includes multiple parts: a title 202, text 204, a tree image 206, and a vehicle image 208. The content 102 is described using a markup language, such as HTML. However, for ease of explanation, the various tag or element syntaxes used by the markup language are not displayed in FIG. 2A. It should be noted that the content 102 illustrated in FIG. 2A is simply a listing of the multiple different parts of the content—this listing is not necessarily indicative of a layout for displaying the content.

FIG. 2B illustrates the content 102 transformed by the content transformation system 100 into transformed content display 212 for a mobile device 214. The content 102 is transformed into the transformed content display 212 using a layout template 216. The layout template 216 includes two layout elements into which images in the content 102 can be ported for display: layout elements 218 and 220. The layout template 216 also includes one layout element into which text in the content 102 can be ported for display, layout element 222. As can be seen in FIGS. 2A and 2B, the text 204 of content 102 is transformed and displayed in layout element 222, the tree image 206 is displayed in layout element 218, and the vehicle image 208 is displayed in layout element 220. Additionally, some parts of the content 102, particularly the title 202, are not displayed in the transformed content display 212 (e.g., due to a lack of display space on the mobile device 214, as accounted for by the layout template 216).

FIG. 2C illustrates the content 102 transformed by the content transformation system 100 into transformed content display 232 for a desktop device 234. The content 102 is transformed into the transformed content display 232 using a layout template 236. The layout template 236 includes two layout elements into which images in the content 102 can be ported for display: layout elements 238 and 240. The layout template 236 also includes one layout element into which text in the content 102 can be ported for display, layout element 242. The layout template 236 also includes one layout element into which a title in the content 102 can be ported for display, layout element 242. As can be seen in FIGS. 2A and 2C, the text 204 of content 102 is displayed in layout element 242, the tree image 206 is displayed in layout element 238, the vehicle image 208 is displayed in layout element 240, and the title 202 is displayed in layout element 244.

Returning to FIG. 1, the content mapping module 112 maps the content 102 into a content categorization tree and also maps each of multiple layout templates in the layout store 116 into a layout categorization tree. The content mapping module 112 compares the content categorization tree to the various layout categorization trees, and selects a layout template having a layout categorization tree that best matches the content categorization tree. Which layout categorization tree best matches the content categorization tree can be determined in various manners based on various different criteria as discussed below.

The content transformation module 114 transforms the content 102 into the transformed content display 104 using the layout template selected by the content mapping module 112. This transformation includes determining which parts of the content 102 are to be displayed in which layout elements of the layout template. Different parts of the content 102 are ported into the appropriate layout elements of the selected layout template. The content transformation module 114 can generate and display the transformed content display 104, or alternatively generate an indication of which parts of the content 102 are to be displayed in which areas of the layout template, and provide this indication to another device for display of the transformed content display 104.

The transformation evaluation module 118 evaluates how well a layout template matches the content. How well the layout template matches the content is a measure of the goodness-of-distribution of the parts of the content 102 based on the loss of information of the content 102 using the layout template, unmapped regions of the layout template (layout elements to which no part of content 102 is ported), and the effect of content transformation (e.g., changes to the content made when porting part of the content to a layout element of the layout template).

The content transformation system 100 can be implemented by any of a variety of different types of devices, such as a desktop computer, a server computer, a laptop or netbook computer, a tablet or notepad computer, an on-chip system, a mobile station, an entertainment appliance, a set-top box communicatively coupled to a display device, a television or other display device, a cellular or other wireless phone, a game console, an automotive computer, and so forth. The content transformation system 100 can be implemented by a single device, or alternatively by multiple devices of the same and/or different types. In situations in which the content transformation system 100 is implemented by multiple devices, the multiple devices can communicate with one another over any of a variety of different types of wired and/or wireless connections, such as one or more data networks (e.g., the Internet, a local area network (LAN), a public telephone network, an intranet, other public and/or proprietary networks, combinations thereof, and so forth).

Figure 3:
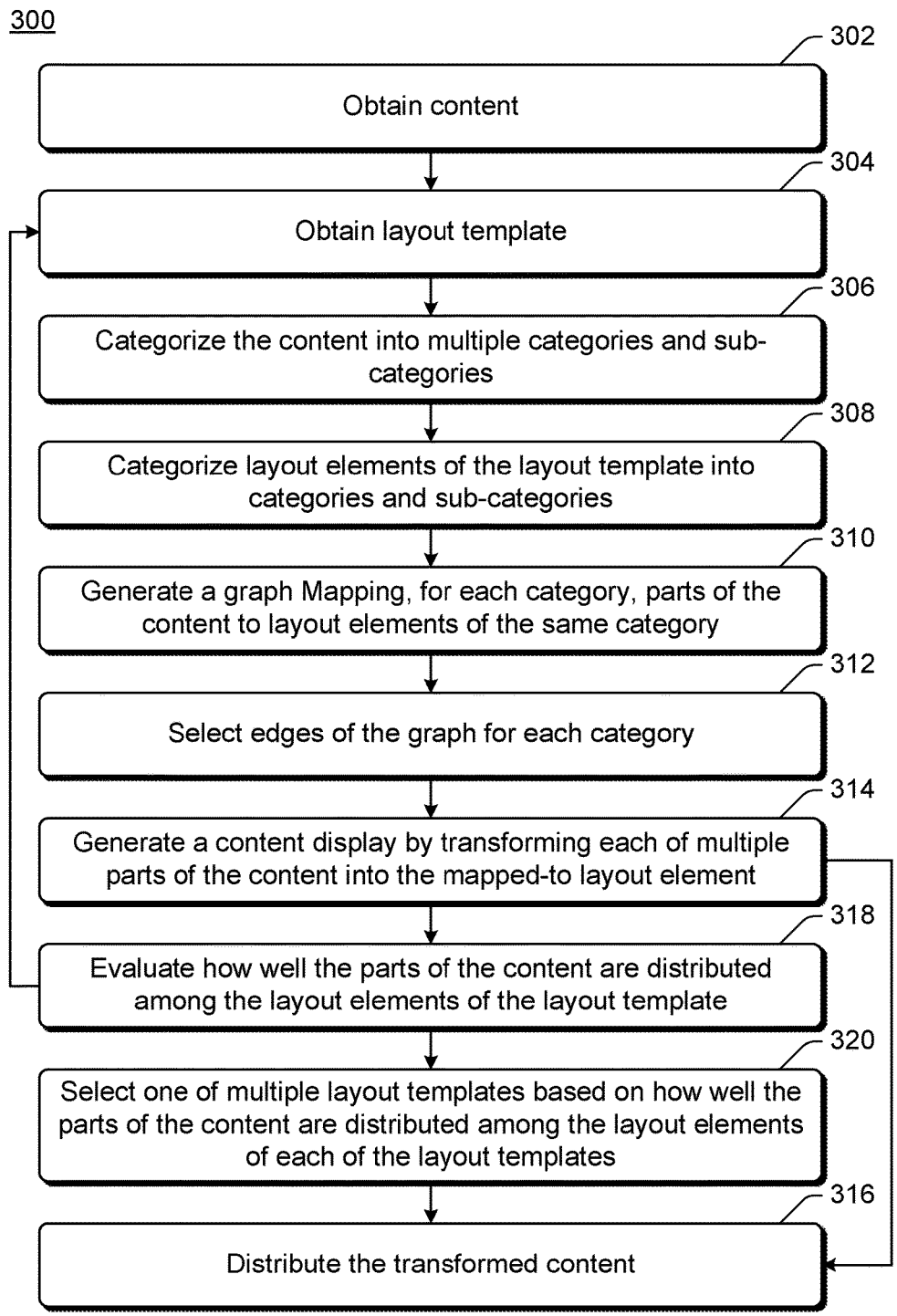
FIG. 3 is a flowchart illustrating an example process for implementing the content to layout template mapping and transformation in accordance with one or more embodiments.

FIG. 3 is a flowchart illustrating an example process 300 for implementing the content to layout template mapping and transformation in accordance with one or more embodiments. Process 300 is carried out by a content transformation system, such as content transformation system 100 of FIG. 1, and can be implemented in software, firmware, hardware, or combinations thereof. Process 300 is shown as a set of acts and is not limited to the order shown for performing the operations of the various acts. Process 300 is an example process for implementing the content to layout template mapping and transformation; additional discussions of implementing the content to layout template mapping and transformation are included herein with reference to different figures.

In process 300, content is obtained (act 302). The content can be obtained in any of a variety of different manners, such as retrieved from a local or remote storage device, passed to the process 300 as a parameter, and so forth.

A layout template is also obtained (act 304). The layout template can be obtained in any of a variety of different manners, such as retrieved from a local or remote storage device (e.g., the layout store 116 of FIG. 1), passed to the process 300 as a parameter, and so forth.

The obtained content is categorized into multiple categories and sub-categories (act 306). This categorizing is discussed herein as being performed by the content tree categorization module 122 of FIG. 1, although the categorizing can alternatively be performed by different modules of the content transformation system 100 of FIG. 1.

The content tree categorization module 122 categorizes the content into multiple categories and possibly sub-categories. Different parts of the content are included in different categories or sub-categories of a categorization tree. Content can be of different types, the type of content referring to a type of information that the content conveys. For example, the content type can be news content (conveying news information), electronic commerce (e-commerce) content (conveying information regarding products or services for sale), and so forth. Each different content type has a corresponding categorization tree that is used to categorize the content into multiple categories. For example, for news content, the content is given as a collection of text, images, and menus that are grouped together into various different categories such as articles, menus, and titles.

For any given content, the type of the content can be determined in a variety of different manners. In one or more embodiments the type of particular content is specified by the author of that particular content. Additionally or alternatively the type of particular content is determined automatically by applying one or more rules or algorithms to the particular content (e.g., based on the data included in the particular content, based on types of tags or other elements included in the particular content, and so forth).

Figure 4:
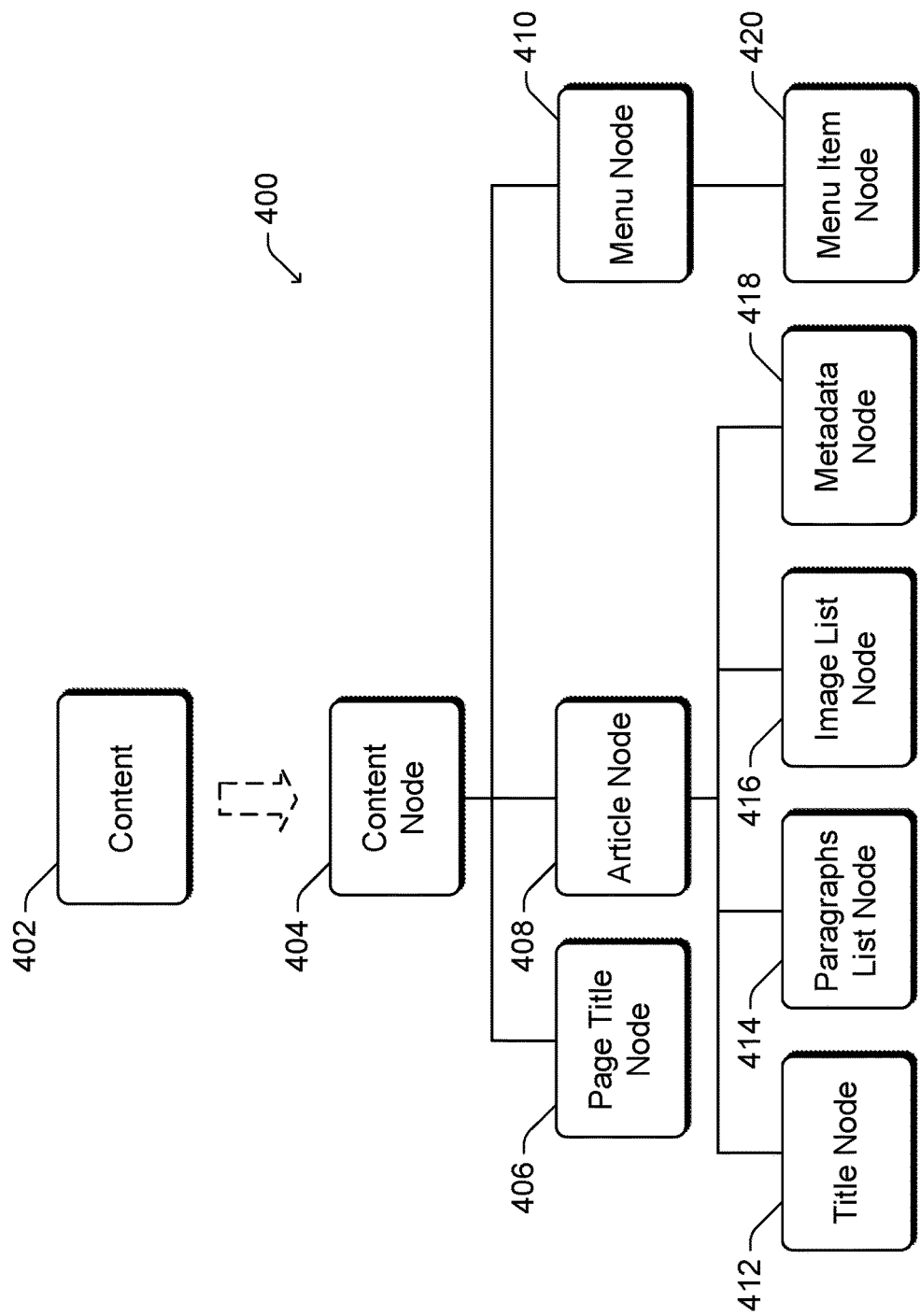
FIG. 4 illustrates an example categorization tree for content in accordance with one or more embodiments.

FIG. 4 illustrates an example categorization tree 400 for content in accordance with one or more embodiments. The categorization tree 400 is for the news type of content, although may also be used for other types of content. The categorization tree 400 for content 402 includes a root content node 404. The content 402 is written in a markup language and includes a page title, one or more articles, and one or more menus. The root content node 404 has at least three child nodes: a page title node 406, one or more article nodes 408, and one or more menus nodes 410. The page title node 406 includes the title of the content 402. Parts of the content 402 represented by the page title node 406 are categorized in the title category, parts of the content 402 represented by an article node 408 are categorized in the article category, and parts of the content 402 represented by a menu node 410 are categorized in the menu category.

Each node in the content categorization tree 400 represents a part of the content 402. This is also referred to herein as the node including the part of the content that the node represents. For example, the page title node 406 represents the title of the content 402, which is also referred to herein as the page title node 406 including the title of the content 402.

Each article node 408 represents an article of the content 402. Each article node 408 has at least four child nodes: a title node 412, a paragraphs list node 414, an image list node 416, and a metadata node 418. The title node 412 includes the title of the article, the paragraphs list node 414 includes the paragraphs (e.g., the text content) of the article, the image list node 416 includes the images (and/or videos) of the article, and the metadata node 418 includes various metadata regarding the article. This metadata can include a criticality of the article, as discussed in more detail below. Parts of the content 402 represented by a page title node 412 are categorized in a title sub-category, parts of the content 402 represented by a paragraphs list node 414 are categorized in the text sub-category, and parts of the content 402 represented by an image list node 416 are categorized in the image sub-category.

Each menu node 410 represents a menu of the content 402. Each menu node 410 has at least one child node: a menu item node 420. The menu item node 420 includes an item in the menu, and has an associated criticality (which may be included in the menu item node 420 itself or in a metadata node (not shown) associated with the menu item node 420 or the menu node 410). Parts of the content 402 represented by a menu item node 420 are categorized in the menu item sub-category.

Each article node 408, as well as each menu item node 420 and the page title node 406, has an associated criticality value. The criticality value of a node refers to the importance of the part of the content represented by the node. The importance of the part of the content represented by a node can be determined in a variety of different manners. In one or more embodiments, the importance of the part of the content represented by a node is assigned by the author or editor of the content 402. Additionally or alternatively, the importance of the part of the content represented by a node can be determined automatically, such as by the content tree categorization module 122 of FIG. 1. Various different rules, algorithms, and/or criteria can be used to automatically determine the importance of a part of the content, such as how recently the part of the content represented by the node has been accessed by a viewer of the content 402, how many times over a particular time range (e.g., per hour or per day) the part of the content represented by the node is accessed by a viewer of the content 402, a click-through rate for the part of the content represented by the node (e.g., how many times over a particular time range a link in the content is selected by a viewer of the content 402), an amount of revenue the part of the content represented by the node (or the product described in the content in the node) generates for the author or distributor of the content 402, the presence of particular words or phrases in the part of the content represented by the node, an order in which the part of the content represented by the node appears in the content 402 (e.g., menu items higher in a menu may have a greater importance than menu items lower in the menu), and so forth.

Which parts of the content 402 are represented by which nodes of the categorization tree 400 can be determined in a variety of different manners. In one or more embodiments, which parts of the content 402 are represented by which nodes of the categorization tree 400 is assigned by the author or editor of the content 402. The author or editor of the content 402 can have knowledge of the structure of the categorization tree 400, and thus can readily assign different parts of the content 402 to different nodes of the tree 400. Additionally or alternatively, which parts of the content 402 are represented by which nodes of the categorization tree 400 can be determined automatically, such as by the content tree categorization module 122 of FIG. 1. Various different rules, algorithms, and/or criteria can be used to automatically determine which parts of the content 402 are represented by which nodes of the categorization tree 400, such as analyzing markup language tags or elements (e.g., particular tags or elements, or tags or elements having particular attributes or characteristics, are included in particular nodes of the tree 400).

It should be noted that the categorization tree 400 is an example of a categorization tree for news content, and that other nodes can additionally or alternatively be included in the categorization tree 400. For example, each article node 408 can have child nodes that include a date of the article, an author of the article, and so forth. Other categorization trees for other types of content can also be structured differently. For example, for content of the e-commerce type, rather than article nodes 408 the categorization tree may include product description nodes each having child nodes that include the title or name of a product, the technical specification of a product, the description of the product, and so forth Returning to FIG. 3, layout elements of the obtained layout template are categorized into multiple categories and sub-categories (act 308). This categorizing is discussed herein as being performed by the layout tree categorization module 124 of FIG. 1, although the categorizing can alternatively be performed by different modules of the content transformation system 100 of FIG. 1. The layout template that is categorized can be the layout template of a portion of a site page (e.g., part of a Web page) or the layout template of an entire site page (e.g., an entire Web page).

The layout tree categorization module 124 categorizes the layout elements of the layout template into multiple categories and possibly sub-categories. Different layout elements of the layout template are assigned to different categories or sub-categories of a layout categorization tree. The layout elements are categorized into different categories or sub-categories that are the same as the categories or sub-categories in the content categorization tree. Based on the structure of the layout template, different layout elements of the layout template are categorized into various groups and then optionally into sub-categories similar to the content categorization tree discussed above. Layout elements also have an associated criticality value. Similar to the criticality values of the nodes of the content categorization tree, the criticality value associated with a layout element refers to the importance of content that is to be included in the node (e.g., displayed by the layout element represented by the node).

Figure 5:
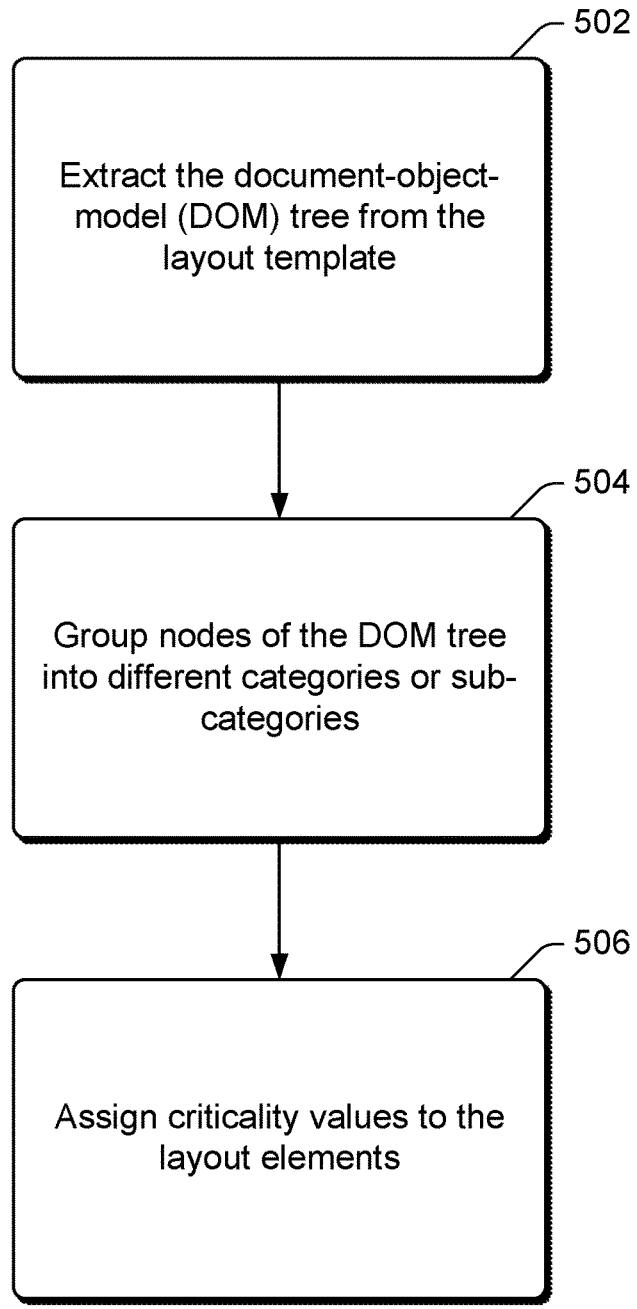
FIG. 5 is a flowchart illustrating an example process for categorizing a layout template in accordance with one or more embodiments.

FIG. 5 is a flowchart illustrating an example process 500 for categorizing a layout template in accordance with one or more embodiments. Process 500 is carried out by a module of a content transformation system, such as the layout tree categorization module 124 of FIG. 1, and can be implemented in software, firmware, hardware, or combinations thereof. Process 500 is shown as a set of acts and is not limited to the order shown for performing the operations of the various acts. Process 500 is an example process for categorizing a layout; additional discussions of categorizing a layout are included herein with reference to different figures.

In process 500, the document-object-model (DOM) tree of a layout template is extracted (act 502). The DOM tree is optionally cleaned and compressed in act 502 to remove redundancies. The components (e.g., tags or other elements) of a layout template are organized into a tree structure with the components being nodes of the tree. The DOM tree can be obtained in any of a variety of different manners. In one or more embodiments, the DOM tree is created or defined by the author or editor of the layout template. Additionally or alternatively, any of a variety of different public and/or proprietary techniques can be used to automatically generate the DOM tree for a layout template. For example, any of the class of page segmentation algorithms that partitions an input layout into visually salient region can be used, such as the Bento Page Segmentation algorithm.

Nodes of the DOM tree are grouped into different categories or sub-categories (act 504). The categories or sub-categories are the same categories or sub-categories as included in the content categorization tree (e.g., page, article, and menu categories as discussed above with reference to the example of FIG. 4). Child nodes of the DOM tree are grouped into a particular category or sub-category based on the type of the child node in the DOM tree.

The type of a child node is identified by the type (e.g., the tag in HTML) of the node. Continuing with this same example, a child node of the DOM tree having a paragraph tag or element (e.g., a <p> tag) is assigned a type of "text". A child node of the DOM tree having an image tag or element (e.g., an <img> tag) is assigned the type of "image". A child node of the DOM tree having a list item tag or element (e.g., an <li> tag) is assigned the type of "list item". A child node of the DOM tree having a heading tag or element (e.g., an <h1> tag, an <h2> tag, an <h3> tag, etc.) is assigned the type of "heading".

Based on these assigned types, the leaf nodes of the DOM tree are assigned to a sub-category based on the type of child node. By way of example, for news content the categories include article, menu, and title categories as discussed above, and the sub-categories include title, text, image, and menu item sub-categories as discussed above, and each of the leaf nodes of the DOM tree is assigned to a sub-category of title, text, image, and menu item. Multiple leaf nodes of the DOM tree can be grouped together into the same category. For example, if two leaf nodes of the DOM tree have the same parent node in the DOM tree, and one of the two leaf nodes is assigned the type of heading and the other of the two leaf nodes is assigned the type of text then those two leaf nodes are grouped together as an article category.

Leaf nodes of the DOM tree are grouped together into a category based on the similarity of the leaf nodes. Many layouts have several symmetrical/repeating structures, which can be in the form of lists, menus or tables. For example, on a news or e-commerce website, there are usually card-like or lists of similar structured elements containing symmetrical information. Such similarly structured elements are identified in the DOM tree by calculating a similarity index for sibling nodes of the DOM tree (sibling nodes being nodes having the same parent node in the DOM tree) based on multiple factors. In one or more embodiments, these multiple factors include similarity in display area height of the sibling nodes, similarity in display area width of the sibling nodes, similarity in the number of nodes in the subtrees of each of the sibling nodes, and the similarity in the types of nodes in the subtrees of each of the sibling nodes.

The similarity in display area height of the sibling nodes refers to the heights of the display areas in which the content of the sibling nodes is displayed being similar (e.g., within a threshold amount of one another, such as the heights being within a threshold number of display pixels of one another (e.g., 10 pixels) or a threshold percentage of one another (e.g., the two heights differing by no more than a threshold percentage of one of the heights, such as 10%)). The similarity in display area width of the sibling nodes refers to the widths of the display areas in which the content of the sibling nodes is displayed being similar (e.g., within a threshold amount of one another, such as the widths being within a threshold number of display pixels of one another (e.g., 10 pixels) or a threshold percentage of one another (e.g., the two widths differing by no more than a threshold percentage of one of the widths, such as 10%)).

The similarity in the number of nodes in the subtrees of each of the sibling nodes refers to a count of all of the nodes in the subtrees below the sibling nodes being similar (e.g., within a threshold amount of one another, such as the counts being within a threshold number of nodes of one another (e.g., 3 nodes) or a threshold percentage of one another (e.g., the two counts differing by no more than a threshold percentage of one of the counts, such as 10%)). The similarity in the types of nodes in the subtrees of each of the sibling nodes refers to whether the assigned types of the nodes in the subtrees below the sibling nodes are similar (e.g., a threshold percentage of the nodes (e.g., 75%) are of the same type).

These multiple factors are used to determine the similarity index for sibling nodes. In one or more embodiments the similarity index is one of two values, one of the two values indicating a high similarity of the sibling nodes and the other of the two values indicating a low (or not high) similarity of the sibling nodes. These multiple factors can be combined or used in different manners to determine the similarity index for sibling nodes, such as by determining that the similarity index is high only if all four of the factors indicate that the sibling nodes are similar, determining that the similarity index is high only if at least a threshold number (e.g., 75 percent) of the multiple factors indicate that the sibling nodes are similar, weighting the multiple factors differently and determining that the similarity index is high only if at least a threshold number (e.g., 65 percent) of the weighted multiple factors indicate that the sibling nodes are similar, and so forth.

If more than a threshold number (e.g., 75 percent) of the sibling nodes have a high similarity index, then the sibling nodes are grouped together into the same category. In one or more embodiments, this category into which the sibling nodes are grouped is based on the category that a majority of the children nodes of the sibling nodes correspond to. For example, children nodes of the menu item sub-category correspond to the menu category, children nodes of the text and image sub-categories correspond to the article category, and so forth.

However, if more than the threshold number of the sibling nodes do not have a high similarity index, then the sibling nodes are grouped into a category based on the properties of the sibling nodes. These properties can include, for example, the number of nodes of the image type in the subtree of the node, the number of nodes of the text type in the subtree of the node, the number of nodes of the heading type in the subtree of the node, the number of nodes of the list item type in the subtree of the node, the height of the display area in which the content of the node is displayed, the width of the display area in which the content of the node is displayed, the position of the display area on the screen when content of the node is displayed, the distribution of types of tags or elements in the display area on the screen when content of the node is displayed, and so forth. Various different rules, algorithms, and/or criteria can be used to determine the category of these nodes based on these properties, such as nodes having images being in the article sub-category, nodes having a display area with less than a threshold height (e.g., 20 pixels) and less than a threshold width (e.g., 30 pixels) being in the menu sub-category, and so forth.

Figure 6:
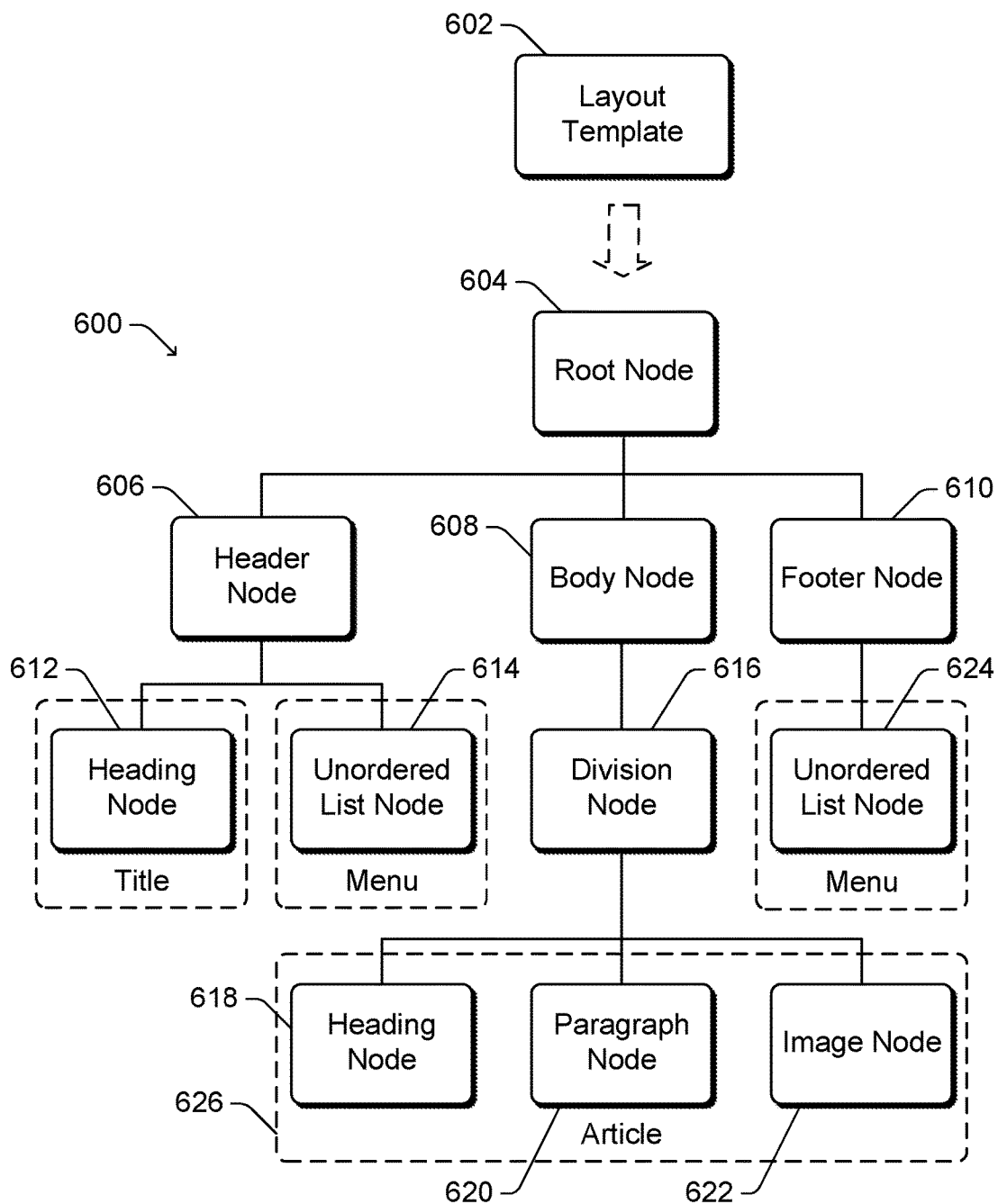
FIG. 6 illustrates an example layout categorization tree for a layout template in accordance with one or more embodiments.

FIG. 6 illustrates an example layout categorization tree 600 for a layout template in accordance with one or more embodiments. The layout categorization tree 600 is for a layout template 602 that includes a root layout node 604. The layout categorization tree 600 is, for example, the DOM tree extracted in act 502 of FIG. 5. The layout template 602 is written in a markup language and includes multiple layout elements. The root layout node 604 has at least three child nodes: a header node 606, a body node 608, and a footer node 610. The header node 606 represents the header section of the layout template, the footer node 610 represents the footer of the layout template, and the body node 608 represents the body of the layout template (situated between the header and the footer).

The header node 606 includes two children nodes: a heading node 612 and an unordered list node 614. The heading node 612 represents an area in which the text of the heading is displayed, and the unordered list node 614 represents an area in which an unordered list (e.g., a bullet list) for the header is displayed.

The body node 608 includes as a child node a division node 616. The division node 616 represents a section or division in the layout 602. The division node 616 has three children nodes: a heading node 618, a paragraph node 620, and an image node 622. The heading node 618 represents an area in which a heading of the section or division is displayed, the paragraph node 620 represents an area in which text of the section or division is displayed, and the image node 622 represents an area in which an image of the section or division is displayed.

The footer node 610 includes as a child node an unordered list node 624. The unordered list node 624 represents an area in which an unordered list (e.g., a bullet list) for the footer is displayed.

The heading node 612 is categorized in the title category, and each of the unordered list nodes 614 and 624 are categorized in the menu category. The heading node 618, the paragraph node 620, and the image node 622 are categorized in the article category. The children nodes (nodes 618, 620, and 622) of the division node 616 are all grouped together in the article category, thus the division node 616 (the parent node of the nodes 618, 620, and 622) can also be categorized in the article category.

Each of these groups of nodes represents a layout element for the layout template 602. For example, the heading node 612 represents a layout element for the title category. By way of another example, the heading node 618, the paragraph node 620, and the image node 622 together represent a layout element for the article category. The leaf nodes represent sub-category portions of the category based on their types as discussed above. For example, the paragraph node 620 represents a text sub-category portion of the layout element for the article category, the image node 622 represents an image sub-category portion of the layout element for the article category, and so forth.

Returning to FIG. 5, criticality values are also assigned to the layout elements (act 506). The layout elements are layout nodes of a layout categorization tree, which is analogous to the content categorization tree 400 of FIG. 4 and is based on the DOM tree. For example, the heading node 618, paragraph node 620, and image node 622 of FIG. 6 is each a sub-category and a child node of a layout node in the layout categorization tree (an article layout node 626). Each layout node of the layout categorization tree has an associated criticality value. The criticality value of a layout node refers to the importance of placing a part of the content in that layout node (e.g., whether the part of the content be a page title, article, or menu) of the layout. Placing content in a layout node is also referred to as porting or displaying part of the content (e.g., the content 102 of FIG. 1) into a layout element represented by the layout node. The importance of placing part of the content in a layout node can be determined in a variety of different manners. In one or more embodiments, the importance of placing part of the content in a layout node is assigned by the author or designer of the layout template. Additionally or alternatively, the importance of placing part of the content in a layout node can be determined automatically, such as by the layout tree categorization module 124 of FIG. 1. Various different criteria can be used to automatically determine the importance of placing part of the content in a layout node, such as the size, location, and/or other factors. In one or more embodiments, a feature vector is extracted for the layout node, the feature vector including the following values: an area value that indicates the display area (e.g., in pixels) in which content of the layout node is displayed, a top distance value that indicates the distance (e.g., in pixels) from the top of the display at which the content of the layout node is displayed, a left distance value that indicates the distance (e.g., in pixels) from the left side of the display at which the content of the layout node is displayed, an image value that indicates whether the layout node is (or a child thereof is) an image node, a text value that indicates whether the layout node is (or a child thereof is) a text node, and a title value that indicates whether the layout node is (or a child thereof is) a title node.

Various different rules and/or algorithms can be used to automatically determine the importance of placing part of the content in a layout node, such as adding or otherwise combining the values in the feature vector, assigning weights to the different values in the feature vector and adding or otherwise combining the weighted values in the feature vector, and so forth.

Table I includes example pseudocode that can be used to categorize a layout in accordance with one or more embodiments. It should be noted that the pseudocode of Table I is merely an example, and that the categorization of the layout can be performed in other manners.

TABLE I

| Line | Code |
|---|---|
| 1 | Lt = Extract html DOM tree of Layout |
| 2 | for each node N in Lt do |
| 3 |     delete N if N.area=0 |
| 4 |     merge_nodes (N, N.child) if N.num_children=1 |
| 5 | end for |
| 6 | for each Node N in Lt in depth first order do |
| 7 |     if N is leaf node do |
| 8 |         assign type as text, image, list item or heading based on tag type |
| 9 |     end if |
| 10 |     else do |
| 11 |         calculate SimilarityIndex of N.children |
| 12 |         if SimilarityIndex is high do |
| 13 |             N.category="list_category" of the majority of N.children |
| 14 |         end if |
| 15 |         else do |
| 16 |             N.category=decide categories within content categories based on properties {num_imgs, num_words, num_headings, num_list_items, height, width, position, area_distribution of tag_types} |
| 17 |         end else |
| 18 |     end else |
| 19 |     criticality_vector=[N.area, N.dist_from_top, N.dist_from_left, has_image, has_text, has_title] |
| 20 |     N.criticality=$\Sigma\ W_{N.category,i}$ * (criticality_vector$_i$) |
| 21 | end for |
| 22 | return (Lt) |

At line 1, the DOM tree of the layout is extracted.

At lines 2-5, the DOM tree is compressed by deleting a node from the DOM tree if the display area of the content that would be included in the node is zero (and thus nothing would be displayed regardless of the content in the node). Additionally, if a node has only one child, then that node and it's child are combined into a single node.

At lines 6-21, each node in the DOM tree is analyzed in a depth first order and assigned a type (e.g., a sub-category) and a criticality value. At lines 7-9, if the node being analyzed is a leaf node then the node is assigned a type of text, image, list item, or heading. At line 10-18, the node is further analyzed if the node is not a leaf node. At line 11, the similarity index of the children nodes is calculated. At lines 12-14, if the calculated similarity index is high then the node being analyzed is categorized into a category that a majority of the children nodes of the node correspond to. At lines 15-17, if the calculated similarity index is not high then node is assigned a category based on various properties of the node. These properties can include, for example, the number of nodes of the image type in the subtree of the node (num_imgs), the number of nodes of the text type in the subtree of the node (num_words), the number of nodes of the heading type in the subtree of the node (num_headings), the number of nodes of the list item type in the subtree of the node (num_list_items), the height of the display area in which the content of the node is displayed, the width of the display area in which the content of the node is displayed, the position of the display area on the screen when content of the node is displayed, and the distribution of types of tags or elements in the display area on the screen when content of the node is displayed (area distribution of tag_types).

At line 19, a criticality vector for the node being analyzed is generated. This criticality vector is a feature vector that includes the following values: an area value that indicates the display area (e.g., in pixels) in which content of the node is displayed (N.area), a top distance value that indicates the distance (e.g., in pixels) from the top of the display at which the content of the node is displayed (N.dist_from_top), a left distance value that indicates the distance (e.g., in pixels) from the left side of the display at which the content of the node is displayed (N.dist_from_left), an image value that indicates whether the node is (or a child thereof is) an image node (has_image), a text value that indicates whether the node is (or a child thereof is) a text node (has_text), and a title value that indicates whether the node is (or a child thereof is) a title node (has_title).

At line 20, the criticality value for the node is generated. This criticality vector is a summation of the weighted feature vector, each value in the feature vector having a different weight W.

At line 22, the categorized layout tree is returned.

Returning to FIG. 3, for each category a map is generated by mapping parts of the content to layout elements in that same category (act 310). This mapping is discussed herein as being performed by the edge construction and mapping module 126 of FIG. 1, although the mapping can alternatively be performed by different modules of the content transformation system 100 of FIG. 1.

The edge construction and mapping module 126 maps, for each category, parts of the content to layout elements of the layout template. Each part of the content is represented by a content node and each layout element is represented by a layout node, and each content node in a category is mapped to each layout node in the same category. A cost associated with each mapping of a content node in the content to a layout node is also generated. The cost of a mapping refers to how well the layout element displays or otherwise represents the content mapped to the layout element. This cost takes into account the ability of the layout element represented by the layout node to take the content part represented by the content node, the loss of information due to content transformation, and the criticality values of the content node and layout node. This yields a bipartite graph between the parts of the content (represented as content nodes) and the layout elements (represented as layout nodes), with edges of the bipartite graph being mappings from content nodes to layout nodes.

Figure 7:
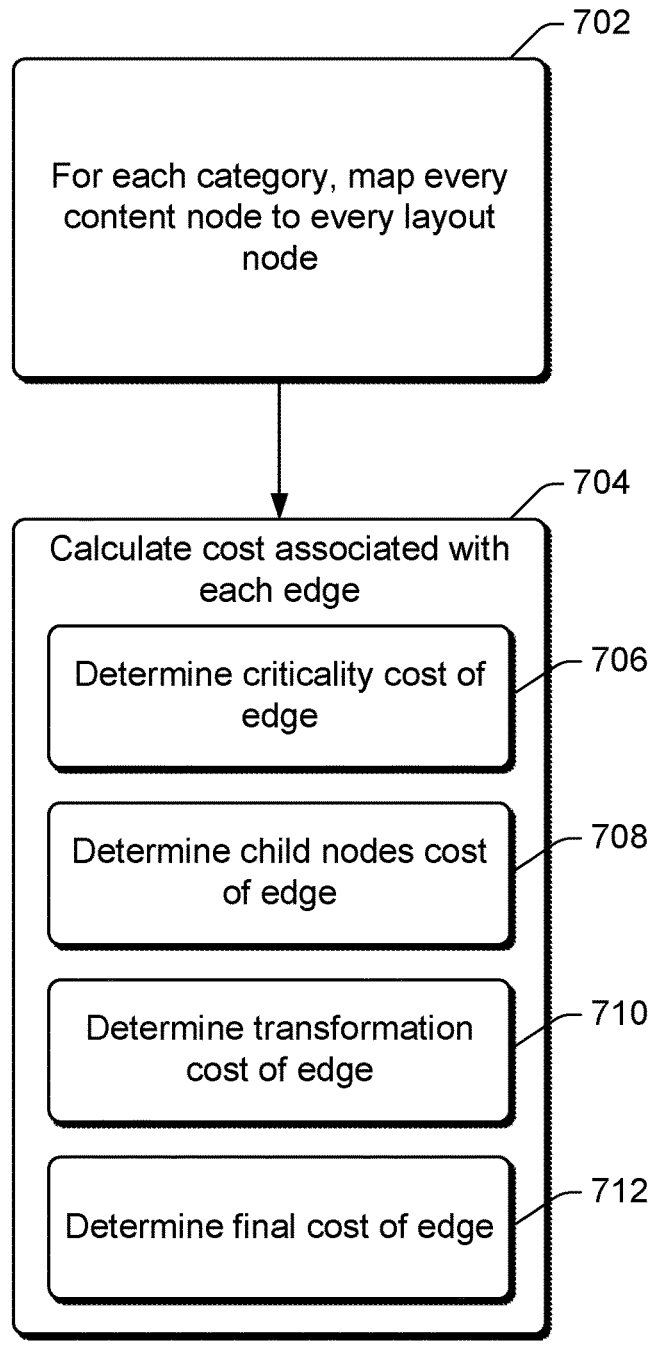
FIG. 7 is a flowchart illustrating an example process for mapping content categorization tree nodes to layout categorization tree nodes and assigning costs to the mappings in accordance with one or more embodiments.

FIG. 7 is a flowchart illustrating an example process 700 for mapping nodes and assigning costs to the mappings in accordance with one or more embodiments. Process 700 is carried out by a module of a content transformation system, such as the edge construction and mapping module 126 of FIG. 1, and can be implemented in software, firmware, hardware, or combinations thereof. Process 700 is shown as a set of acts and is not limited to the order shown for performing the operations of the various acts. Process 700 is an example process for mapping nodes and assigning costs to the mappings; additional discussions of mapping nodes and assigning costs to the mappings are included herein with reference to different figures.

In process 700, for each category (e.g., the article, title, and menu categories discussed above), each content node in the content categorization tree is mapped to each layout node in the layout categorization tree (act 702). This results in each node of the content categorization tree being mapped to each node of the layout categorization for a given category.

Figure 8:
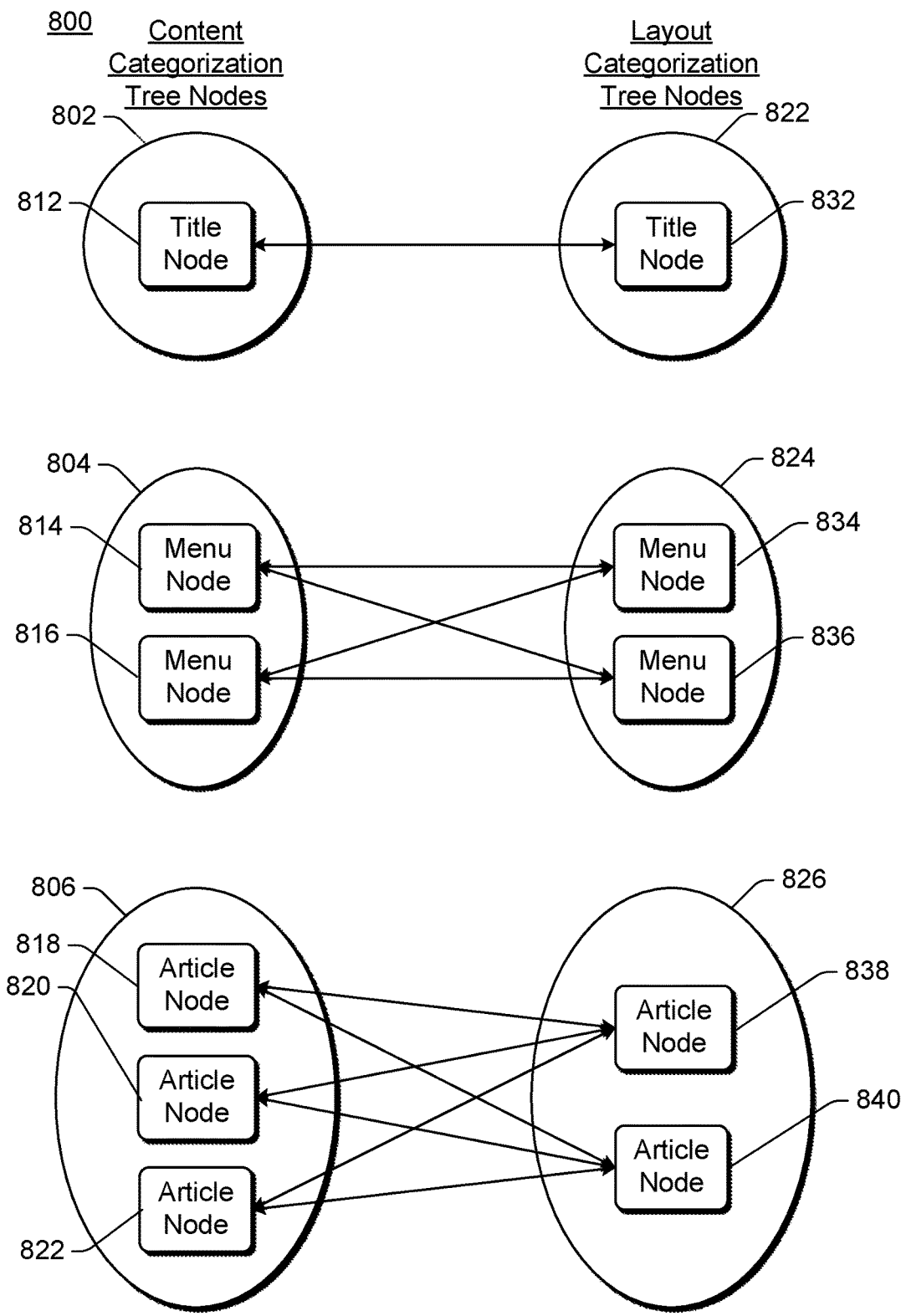
FIG. 8 illustrates an example of the mapping of content nodes to layout nodes.

FIG. 8 illustrates an example 800 of the mapping of content nodes to layout nodes. Nodes of the content categorization tree are illustrated on the left-hand side of example 800, including nodes in the title category 802, the menu category 804, and the article category 806. In the title category 802 there is one title node 812. In the menu category 804 there are two menu nodes: menu node 814 and menu node 816. In the article category 806 there are three nodes: article node 818, article node 820, and article node 822.

Nodes of the layout categorization tree are illustrated on the right-hand side of example 800, including nodes in the title category 822, the menu category 824, and the article category 826. In the title category 822 there is one title node 832. In the menu category 824 there are two menu nodes: menu node 834 and menu node 836. In the article category 826 there are two nodes: article node 838 and article node 840.

As illustrated in example 800 by arrows between the nodes, each node in a category of the content categorization tree is mapped to each node in the same category of the layout categorization tree. For example, title node 812 is mapped to title node 832. By way of another example, each of the menu nodes 814 and 816 is mapped to each of the menu nodes 834 and 836. By way of another example, each of the article nodes 818, 820 and 822 is mapped to each of the article nodes 838 and 840.

The nodes of the content categorization tree and the nodes of the layout categorization tree, together with the arrows connecting the nodes, result in a bipartite graph with the arrows being edges in the graph.

Returning to FIG. 7, the cost associated with each edge in the graph is calculated (act 704). Generally, for each category there are three possible situations. One situation is that there are the same number of content nodes in the content categorization tree as there are layout nodes in the layout categorization tree. In this situation, the costs of the edges are used to decide which content nodes to map to which layout nodes. Another situation is that there are more content nodes in the content categorization tree than there are layout nodes in the layout categorization tree. In this situation, the costs of the edges are used to decide which content nodes to keep and which content nodes to drop, and for the content nodes that are kept to decide which content nodes to map to which layout nodes. Another situation is that there are fewer content nodes in the content categorization tree than there are layout nodes in the layout categorization tree. In this situation, the costs of the edges are used to decide which content nodes to map to which layout nodes, and which layout nodes will have no content nodes mapped to them.

The cost associated with each edge is determined by determining a criticality cost of the edge (act 706), determining a child nodes cost of the edge (act 708), and determining a transformation cost of the edge (act 710). A final cost of the edge is determined (act 712) using these parameters (the criticality cost of the edge, the child nodes cost of the edge, and the transformation cost of the edge). In the discussions herein, an edge having a low cost is deemed a better match of the node in the content categorization tree to the node in the layout categorization tree than an edge having a higher cost. However, it should be noted that the techniques discussed herein can alternatively be implemented so that an edge having a high cost is deemed a better match of the node in the content categorization tree to the node in the layout categorization tree than an edge having a lower cost.

The criticality cost of the edge (as determined in act 706) refers to a cost associated with the difference in criticality values of the two nodes that are connected by the edge, and is calculated as a function of the criticality values of the two nodes. The criticality cost is used so that nodes in the content categorization tree having higher criticality values get mapped to nodes in the layout categorization tree having higher criticality values. In one or more embodiments, the criticality cost of the edge is the absolute difference of the criticality values of the two nodes.

The child nodes cost of the edge (as determined in act 708) refers to a cost associated with the difference in the number of child nodes (as well as their sub-categories) that each of the two nodes that are connected by the edge have. The child nodes cost is used so that content is mapped from a content categorization tree node to the layout element that can accommodate at least most of the child nodes of the content categorization tree node. These child nodes are the sub-category nodes of the content categorization tree nodes and the layout categorization tree nodes. For example, in FIG. 4 the title node 412, paragraphs list node 414, image list node 416, and metadata node 418 are each child nodes of the content categorization tree node represented by the article node 408. By way of another example, the image node 622 of FIG. 6 is a child node of the layout categorization tree node representing the article layout node 626. The child nodes cost of the edge is increased (e.g., by a particular number, by a particular percentage of its current value, etc.) in response to there being sub-categories of child nodes for the content categorization tree node that are not included in the layout categorization tree node. For example, if the content categorization tree node has one or more child nodes of the image sub-category, and the layout categorization tree node has no child nodes of the image sub-category, then the child nodes cost of the edge is increased. Additionally, for child nodes in the same sub-category, the child nodes cost of the edge is increased (e.g., by a particular number, by a particular percentage of its current value, etc.) in response to the content categorization tree node and the layout categorization tree node having different numbers of child nodes in that sub-category. For example, if the content categorization tree node has three child nodes of the image sub-category and the layout categorization tree node has two child nodes of the image sub-category, then the child nodes cost of the edge is increased (e.g., by a value of one, or some other value generated based on the difference between the number of child nodes).

In one or more embodiments, a Boolean value is used for every sub-category under a content categorization tree node and every sub-category under a layout categorization tree node. The Boolean value is assigned True if there exists one or more nodes in that sub-category and False otherwise. The child nodes edge cost is increased if the value of a corresponding Boolean variable in the layout categorization tree node and the content categorization tree node are not equal. For example, if the content categorization tree node has an image child node and there is no image child node for the layout categorization tree node then the child nodes edge cost is increased for that corresponding edge. But, if both the nodes of the layout categorization tree and the content categorization tree have the same number of image nodes, then the child nodes edge cost is not increased.

Situations can arise in which there are multiple child nodes of the same sub-category. In this situation, when transforming or porting content to the layout element the child nodes of the content categorization tree are mapped to child nodes of the layout categorization tree based on the criticality values of the child nodes. These criticality values can be assigned as discussed above. The child node of the content node having the largest criticality value is mapped to the child node of the layout node having the largest criticality value, the child node of the content node having the second largest criticality value is mapped to the child node of the layout node having the second largest criticality value, and so on.

The transformation cost of the edge (as determined in act 710) refers to a cost associated with loss of content when transformed or ported to the layout elements using the mapping from the content categorization tree node to the layout categorization tree node as indicated by the edge. Different layout elements can have different sizes, so all of the content from the content categorization tree node may not fit into the layout categorization tree node (e.g., some text from a paragraph may be lost, an image may be cropped, and so forth). The transformation cost is used to account for the possible loss of information when transforming or porting the content to the layout element.

The transformation cost can be determined in a variety of different manners. In one or more embodiments, the transformation cost is determined by transforming or porting the content from the content categorization tree node to the layout categorization tree node, and any loss in information resulting from the transformation or porting is calculated. The loss of information can be expressed as a particular number (e.g., a number of bytes), as a percentage of the content (e.g., 5% lost), and so forth. Alternatively, the transformation cost can be determined in other manners. For example, the size of the content (e.g., height and width in pixels) in the content categorization tree node can be compared to the size of the layout in the layout categorization tree node, and an estimated loss of information resulting from the transformation or porting can be calculated based on these size differences. The loss of information can be expressed as a particular number (e.g., a number of bytes), as a percentage of the content (e.g., 5% lost), and so forth.

A final cost of the edge is determined (act 712) by combining the values for the criticality cost of the edge, the child nodes cost of the edge, and the transformation cost of the edge. The final cost of the edge is the cost assigned to a layout pair (the transformation or porting of content from the content categorization tree node to the layout categorization tree node). These three costs can be combined in a variety of different manners to determine the final cost of the edge. In one or more embodiments, different weights are assigned to the criticality cost of the edge, the child nodes cost of the edge, and the transformation cost of the edge. These three costs are then multiplied by their respective weights, and the weighted values are summed to generate the final cost of the edge.

Table II includes example pseudocode that can be used to calculate the cost of edges in the bipartite graph in accordance with one or more embodiments. It should be noted that the pseudocode of Table II is merely an example, and that the cost of edges can be calculated in other manners.

TABLE II

Input: Ct = content categorization tree, Lt = layout categorization tree

| Line | Code |
|---|---|
| 1 | categories={articles, menus, titles} |
| 2 | for each category in categories do |
| 3 |   Bipartite_graph[category]={ } |
| 4 |   for nodes Ci in Ct of type category do |
| 5 |     for nodes Lj in Lt of type category do |
| 6 |       Transformation_cost=[ ] |
| 7 |       Fcriticality=F(criticality(Ci), criticality(Lj)) |
| 8 |       Fchild_nodes=f(child_nodes(Ci), (child_nodes(Lj)) |
| 9 |       internal_mapping={ } |
| 10 |       Child_list_content=child_nodes of Ci sorted by criticality |
| 11 |       Child_list_layout=child_nodes of Lj sorted by criticality |
| 12 |       for each content_node in Child_list_content do |
| 13 |         Type=sub-category(content_node) |
| 14 |         layout_node = x where x∈child_list_layout, sub-category(x)=Type, criticality(x)>=criticality(y) ∀ y ∈ child_list_layout & sub-category(y)=Type |
| 15 |         create an edge (content_node, layout_node) |
| 16 |         internal_mapping[Ci,Lj].append([content_node, layout_node]) |
| 17 |         Child_list_content.remove(content_node) |
| 18 |         Child_list_layout.remove (layout_node) |
| 19 |         Ftransformation.append(cost(transforming content_node for layout_node)) |
| 20 |       end for |
| 21 |       w=Fcost(Fcriticality, Fchild_nodes, Ftransformation) |
| 22 |       create edge (Lj, Ci) with edge cost w and mapping internal_mapping |
| 23 |       bipartite_graph[category].append(edge(Lj, Ci, w)) |
| 24 |     end for |

TABLE II-continued

Input: Ct = content categorization tree, Lt = layout categorization tree

Line   Code 25      end for
26  end for
27  return (bipartite_graph, internal_mapping)

The input to the pseudocode of Table II is the content categorization tree (Ct) and the layout categorization tree (Lt). The pseudocode of Table II also uses three categories (e.g., for news content), which are articles, menus, and titles as indicated at line 1. The pseudocode generates a bipartite graph for each category (as indicated at lines 2-3). The actions in lines 6-23 are repeated for each pair of content categorization tree and layout categorization tree nodes in each category (as indicated at lines 4-5), resulting in a bipartite graph with calculated edge costs and an internal mapping of content categorization tree nodes to layout categorization tree nodes. The content categorization tree nodes are referred to as the nodes Ci, and the layout categorization tree nodes are referred to as the nodes Lj.

At line 7 the criticality cost of the edge between the pair of nodes is determined. At line 8 the child nodes cost of the edge between the pair of nodes is determined.

At line 10, a list of the child nodes of the content categorization tree node is created, the child nodes being sorted by their criticality values (e.g., from highest to lowest). At line 11, a list of the child nodes of the layout categorization tree node is created, the child nodes being sorted by their criticality values (e.g., from highest to lowest).

Lines 13-19 are repeated for each child node of the content categorization tree node Ci, in their sorted order (e.g., from highest to lowest criticality value). At line 13, a value "Type" is set to be the sub-category of the child node being analyzed (e.g., image, text, title, etc.). At line 14, the child node of the layout categorization tree node Lj having the highest criticality value is selected. At line 15, an edge is created from the content categorization tree node child being analyzed to the selected layout categorization tree node child (as selected at line 14). At line 16, a set of internal mappings is updated to include the edge created at line 15. At lines 17 and 18, the content categorization tree node child being analyzed and the layout categorization tree node child selected at line 14 are removed from the list of child nodes of the content categorization tree and the list of child nodes of the layout categorization tree. At line 19, the transformation cost of the edge between the content categorization tree node Ci and the layout categorization tree node Lj is updated to include the transformation cost of transforming or porting the content in the content categorization tree node child being analyzed to the layout categorization tree node child selected at line 14.

At line 21, the final cost of the edge between the content categorization tree node Ci and the layout categorization tree node Lj is determined based on the criticality cost of the edge as determined at line 7, the child nodes cost of the edge as determined at line 8, and the transformation cost of the edge as determined at line 19.

At lines 22 and 23, the edge between the content categorization tree node Ci and the layout categorization tree node Lj is added to the bipartite graph for the category, along with the final cost of the edge and the internal mappings for the child nodes (the edges created at line 15).

At line 27, the bipartite graphs for the different categories, as generated at lines 22 and 23, is returned.

Returning to FIG. 3, ones of the edges in the graphs generated for each category are selected (act 312). This selection is discussed herein as being performed by the edge selection module 128 of FIG. 1, although the selection can alternatively be performed by different modules of the content transformation system 100 of FIG. 1.

The edge selection module 128 selects ones of the edges in the bipartite graph generated for each category by the edge construction and mapping module 126. In one or more embodiments, the edge selection module 128 selects, for each category, the set of edges in the bipartite graph for the category having the smallest sum of costs (e.g., selecting edges that minimize the cumulative final edge costs). If there are the same number of content nodes in the content categorization tree as there are layout nodes in the layout categorization tree for a category, then the set of edges selected by the edge selection module 128 includes an edge between each of the content categorization tree nodes and the layout categorization tree nodes. If there are more content nodes in the content categorization tree than there are layout nodes in the layout categorization tree, then the set of edges selected by the edge selection module 128 includes an edge for each content categorization tree node but not each layout categorization tree node. If there are fewer content nodes in the content categorization tree than there are layout nodes in the layout categorization tree, then the set of edges selected by the edge selection module 128 includes an edge for each layout categorization tree node but not each content categorization tree node.

The edge selection module 128 can use any of a variety of different public and/or proprietary techniques to select the edges. This edge selection can also be referred to as an "assignment problem", and any of a variety of different public and/or proprietary techniques for solving this problem can be used. In one or more embodiments, the edge selection module 128 generates a 2-dimensional matrix for the bipartite graphs for each category, with the content categorization tree nodes along one axis of the matrix and the layout categorization tree nodes along the other axis of the matrix, and the cost (also referred to as the weight) of the edge between the ith content categorization tree node and the jth layout categorization tree node being the value in the matrix of the (i,j) entry. The Hungarian algorithm is then used, with the values in the matrix, to select the edges, although other algorithms or techniques can alternatively be used.

Table III includes example pseudocode that can be used to select the edges in the bipartite graphs in accordance with one or more embodiments. It should be noted that the pseudocode of Table III is merely an example, and that the edges of the bipartite graphs can be selected in other manners.

TABLE III

| Line | Code |
|---|---|
| | Input: bipartite graphs for different categories |
| 1 | categories={articles, menus, titles} |
| 2 | for each category do |
| 3 | Emxn←Edge cost matrix with (i,j)th entry = cost of edge between ith content and jth layout |
| 4 | Final_mapped_edges[category]=Mapping(E) |
| 5 | end for |
| 6 | return(Final_mapped_edges) |

The input to the pseudocode of Table III is the bipartite graphs for the different categories (e.g., as determined by the edge construction and mapping module 126, such as using the pseudocode of Table II discussed above). The pseudocode of Table III also uses three categories (e.g., for news content), which are articles, menus, and titles as indicated at line 1. The pseudocode generates a set of final mapped edges for each category (as indicated at lines 2-5).

At line 3, an edge cost matrix is generated with the content categorization tree nodes along one axis of the matrix and the layout categorization tree nodes along the other axis of the matrix, and the cost (also referred to as the weight) of the edge between the ith content categorization tree node and the jth layout categorization tree node being the value in the matrix of the (i,j) entry.

At line 4, the set of edges for the category having the smallest sum of costs (e.g., selecting edges that minimize the cumulative final edge costs) is selected.

At line 6, the selected sets of edges for the different categories are returned.

Returning to FIG. 3, a content display is generated by transforming each of multiple parts of the content into the mapped-to layout element (act 314). This transforming is discussed herein as being performed by the content transformation module 114 of FIG. 1, although the transforming can alternatively be performed by different modules of the content transformation system 100 of FIG. 1.

Given the selected sets of edges mapping the content categorization tree nodes to the layout categorization tree nodes, the content transformation module 114 ports the parts of the content 102 represented by the content categorization tree nodes to the layout elements represented by the layout categorization tree nodes in order to generate the transformed content display 104. For the particular part of the content being ported into a particular layout element, situations can arise in which the display area for the particular layout element is not big enough (e.g., does not have a large enough height and width) to display the part of the content. For example, there may be insufficient area in the particular element to display all of the desired text, an uncropped image, and so forth.

The content transformation module 114 identifies these situations and transforms the part of the content as appropriate so that at least some of the part of the content (or a representation of the content) can be displayed in the layout element. The nature of the part of the content dictates the type of transformation that the content can be subjected to. For example, textual content can be summarized or expanded to fit in a particular layout element. By way of another example, image content can be resized or smartly cropped based on the layout size restriction. Once transformed, the content can be rendered on the layout element and delivered (e.g., displayed).

In one or more embodiments, for text content the content transformation module 114 checks whether the size of the content in the content categorization tree node is greater than the display area of the layout element for the layout categorization tree node (including checks for any child nodes). If the size of the content in the content categorization tree node is not greater than the display area of the layout element for the layout categorization tree node, then the content transformation module 114 makes no changes to the content. However, if the size of the content in the content categorization tree node (including any child nodes) is greater than the display area of the layout element for the layout categorization tree node (including any child nodes), then the content transformation module 114 applies a summarization technique to generate transformed content that is not greater than the display area of the layout element. Various different summarization techniques can be used, such as any of a variety of public and/or proprietary techniques for generating new text that summarizes the content. Additionally or alternatively, a portion of the content (e.g., the first few sentences) can be displayed and a user-selectable link included (e.g., labelled "more") that can be selected by the user to jump to display of the full content (e.g., a different web page).

In one or more embodiments, for image content the content transformation module 114 checks whether the size of the content in the content categorization tree node is equal to the display area of the layout element for the layout categorization tree node (including checks for any child nodes). If the size of the content in the content categorization tree node is equal to the display area of the layout element for the layout categorization tree node, then the content transformation module 114 makes no changes to the content. However, if the size of the content in the content categorization tree node (including any child nodes) is not equal to the display area of the layout element for the layout categorization tree node (including any child nodes), then the content transformation module 114 crops the image, resizes the image, or both crops and resizes the image to generate transformed content that is not greater than the display area of the layout element. In one or more embodiments, the content transformation module 114 is configured to always crop the image, always resize the image, or both crop and resize the image. Alternatively, the content transformation module 114 can apply various different rules or criteria to determine whether to crop the image, resize the image, or both crop and resize the image.

For example, the content transformation module 114 generates three transformed images based on the content (one by cropping the image content, one by resizing the image content, and one by both cropping and resizing the image content). The content transformation module 114 then analyzes the three transformed images and selects the one that is closest to (e.g., has the least amount of data loss) the image content, and uses the selected transformed image in the layout element. The content transformation module 114 can determine which transformed image is closest to the image content in various manners, such as by calculating the Bhattacharya distance between the image content and each transformed image, and selecting the transformed image having the smallest Bhattacharya distance from the image content.

Table IV includes example pseudocode that can be used to transform content in accordance with one or more embodiments. It should be noted that the pseudocode of Table IV is merely an example, and that the content can be transformed in other manners.

TABLE IV

Input: Final_mapped_edges, internal_mapping

| Line | Code |
|---|---|
| 1 | for each category in categories do |
| 2 |     for each edge(Ci,Lj) in Final_mapped_edges[category] do |
| 3 |         for each mapping=(content_node, layout_node) in internal_mapping[Ci, Lj] do |
| 4 |             mapped_content.content=content_node.content |
| 5 |             if content_node.type = "text" & content_node.size > layout_node.size |
| 6 |                 mapped_content.content=summarize(content_node.text, layout_node.size) |
| 7 |             end if |
| 8 |             if content_node.type="img" & content_node.size ≠ layout_node.size |
| 9 |                 TransformedImg1=imageResize(content_node.content, layout_node.size) |
| 10 |                 TransformedImg2=imageCrop(content_node.content, layout_node.size) |
| 11 |                 TransformedImg3=imageCropResize(content_node.content, layout_node.size) |
| 12 |                 Final_image=Select Img with least Bhattacharya distance from original image |
| 13 |                 mapped_content.content=Final_image |
| 14 |             end if |
| 15 |             layout_node.populate(mapped_content) |
| 16 |         end for |
| 17 |     end for |
| 18 | end for |

The input to the pseudocode of Table IV is the set of final mapped edges for each category (e.g., as determined by the edge selection module 128, such as using the pseudocode of Table III discussed above) and the internal mappings for the child nodes (e.g., as determined by the edge construction and mapping module 126, such as using the pseudocode of Table II discussed above). The pseudocode of Table IV generates the ported (some of which is transformed) content for each text node and each image node of the content categorization tree. The actions in lines 4-15 are repeated for each pair of content categorization tree and layout categorization tree nodes in each category and for each pair of content categorization tree and layout categorization tree child node mappings (as indicated at lines 2 and 3). The content categorization tree nodes are referred to as the nodes Ci, and the layout categorization tree nodes are referred to as the nodes Lj.

The nodes Ci and the nodes Lj can each have multiple child nodes of text content and/or image content, and internal mappings of the child nodes are determined as discussed above.

At line 4, for each layout categorization tree node the mapped content in the layout categorization tree node is initially set to be the content of the content categorization tree node mapping to the layout categorization tree node and/or for each layout categorization tree node child the mapped content in the layout categorization tree node child is initially set to be the content of the content categorization tree node child mapping to the layout categorization tree node child.

At lines 5-6, if the content of the content categorization tree node Ci is text content and the size of the text content in the content categorization tree node Ci is greater than the display area of the layout element represented by the layout categorization tree node Lj, then the content is summarized and the mapped content in the layout element represented by the layout categorization tree node Lj is replaced with the summarized content. Similarly, if the content of the content categorization tree node Ci child is text content and the size of the text content in the content categorization tree node Ci child is greater than the display area of the portion of the layout element represented by the layout categorization tree node Lj child, then the content is summarized and the mapped content in the portion of the layout element represented by the layout categorization tree node Lj child is replaced with the summarized content. This summarization of the content can be performed in various different manners as discussed above.

At line 8, a check is made as to whether the content of the content categorization tree node Ci is image content and the size of the content in the content categorization tree node Ci is equal to the display area of the layout element represented by the layout categorization tree node Lj. If the sizes are equal (e.g., have the same height and width in pixels) then the mapped content in the layout element represented by the layout categorization tree node Lj remains the content of the content categorization tree node Ci (as set at line 4). Similarly, a check is made as to whether the content of the content categorization tree node Ci child is image content and the size of the content in the content categorization tree node Ci child is equal to the display area of the portion of the layout element represented by the layout categorization tree node Lj child. If the sizes are equal (e.g., have the same height and width in pixels) then the mapped content in the portion of the layout element represented by the layout categorization tree node Lj child remains the content of the content categorization tree node Ci child (as set at line 4).

If the sizes are not equal, then three transformed images are generated. At line 9, a first transformed image is generated that resizes (e.g., reduces or enlarges) the content in the content categorization tree node Ci (or the content categorization tree node Ci child) to be the same size as the size of the layout element represented by the layout categorization tree node Lj (or the portion of the layout element represented by layout categorization tree node Lj child). At line 10, a second transformed image is generated that crops the content in the content categorization tree node Ci (or the content categorization tree node Ci child) to be the same size as the size of the layout element represented by the layout categorization tree node Lj (or the portion of the layout element represented by layout categorization tree node Lj child). At line 11, a third transformed image is generated that both resizes (e.g., reduces or enlarges) and crops the content in the content categorization tree node Ci (or the content categorization tree node Ci child) to be the same size as the size of the layout element represented by the layout categorization tree node Lj (or the portion of the layout element represented by layout categorization tree node Lj child). At line 12, the one of the first transformed image, the second transformed image, and the third transformed image having the least Bhattacharya distance from the content in the content categorization tree node Ci (or the content categorization tree node Ci child) is selected. At line 13, the mapped content in the layout element represented by the layout categorization tree node Lj is replaced with the selected one of the first transformed image, the second transformed image, and the third transformed image. Similarly, the mapped content in the portion of the layout element represented by the layout categorization tree node Lj child is replaced with the selected one of the first transformed image, the second transformed image, and the third transformed image.

At line 15, the mapped content in the layout element Lj and each child of the layout element Lj (as set at line 4, lines 5-6, or line 13) is used as the content for the layout template.

Returning to FIG. 3, the process 300 can be performed for a single layout template or repeated for multiple different layout templates. If the process 300 is performed for a single layout template, then the transformed content is distributed (act 316). The transformed content can be distributed in various different manners, such as by being displayed by the content transformation system 100 of FIG. 1, by being communicated to another device for display, and so forth. The transformed content itself can be communicated to another device for display in act 316, or alternatively the content 102 and the layout template can be communicated to another device to generate the transformed content for display (e.g., at that other device).

However, if the process 300 is performed for multiple layout templates, then an evaluation is made as to how well the parts of the content are distributed among the layout elements of the layout template (act 318). This evaluation is discussed herein as being performed by the transformation evaluation module 118 of FIG. 1, although the evaluation can alternatively be performed by different modules of the content transformation system 100 of FIG. 1.

If there are additional layout templates to evaluate, process 300 then returns to act 304 to obtain another layout template. Acts 304-314 are performed for each of the multiple layout templates being analyzed by the content transformation system 100. E.g., these multiple layout templates can be each of multiple layout templates for a particular display. However, if there are no additional layout templates to evaluate, then one of the multiple layout templates is selected based on how well parts of the content are distributed among the layout elements of each of the layout templates (act 320). This selection is discussed herein as being performed by the transformation evaluation module 118 of FIG. 1, although the selection can alternatively be performed by different modules of the content transformation system 100 of FIG. 1.

The layout template with ported content as generated by the content transformation module 114 can be displayed as the transformed content display 104. In one or more embodiments, however, there are multiple different layout templates for which the transformed content can be generated. For example, the content transformation system 100 may be transforming the content 102 for display on a mobile device and the layout store 116 may include 20-30 different layout templates for the mobile device. In such situations, the content mapping module 112 and the content transformation module 114 can generate layout templates with transformed content for each of the multiple different layout templates, and the transformation evaluation module 118 evaluates these multiple layout templates with transformed content to determine which is displayed as the transformed content display 104.

In one or more embodiments, the transformation evaluation module 118 uses multiple different metrics that measure different aspects of the content distribution. One metric is a mapping cost metric, another metric is an unmapped loss metric, and another metric is a transformation loss metric. Although three metrics are discussed herein, it should be noted that additional or fewer metrics can be used.

The mapping cost metric evaluates the total cost incurred due to the final mapping. This total cost is measured as the weighted average cost of the final mapped edges, based on the criticality of the content node that gets transformed into the particular layout element. The mapping cost metric indicates how well the final mapping captures the most critical content in the desired positions (the most critical parts of the layout).

In one or more embodiments, the mapping cost metric E is defined as follows:

$$E = \frac{\sum_{e \in Final\_mapped\_edges} W_e * (C(c_e) + C(l_e))}{\sum_{e \in Final\_mapped\_edges} (C(c_e) + C(l_e))}$$

where $W_e$ is the cost of edge e in the final mapping between content node $c_e$ and layout node $l_e$, and C(x) denotes the criticality of node x. Lower values of E indicate a better overall mapping than higher values of E.

The unmapped loss metric is a measure of the loss of use of parts of the layout due to the lack of content that can potentially be mapped to those parts. The unmapped loss metric provides an indication of situations in which there is insufficient content to map into all the elements of a layout. The unmapped loss metric is measured by the percentage of area in the layout that is not mapped by the content transformation system 100.

In one or more embodiments, the unmapped loss metric A is defined as follows:

$$A = \frac{\sum_{l \in Unmapped\_nodes} C(l) * A_l}{\sum_{l \in layout\_node} C(l) * A_l}$$

where $A_l$ is the area of layout node l, and C(x) denotes the criticality of node x. Lower values of A indicate that content is mapped to more of the parts in the layout than higher values of A.

The transformation loss metric is a measure of the loss incurred due to transforming the content to the layout. The transformation loss metric considers the loss occurred in the content due to various transformations applied to fit the content in the layout.

In one or more embodiments, the transformation loss T is defined as follows:

$$T = 1 - \frac{\sum_{i=0}^{n} A_i * t_i}{\sum_{i=0}^{n} A_i}$$

where $A_i$ is the area of the image container in the layout, $t_i$ is the Bhattacharya coefficient between the original and transformed images, and n is the number of nodes in the layout. Lesser values of T signify that the loss in content is less than larger values of T. Analogous loss functions can be calculated for textual components as well, with the Bhattacharya coefficient $t_i$ being replaced by a value representing the loss of text content (e.g., a count of words that are lost, a value indicating how much the content was summarized, and so forth).

The use of the different metrics measuring different aspects of the content distribution allow determinations to be made as to which metric is more important. An administrator or designer (e.g., of the content or the layout) can specify which metric is to be used, and the layout with the best (e.g., lowest) score for the specified metric is the layout to which the content is mapped. Which metric is to be used can optionally be changed over time based on changes in desires of the administrator or designer, based on feedback received from users, and so forth. Additionally or alternatively, different weights can be applied to the different metrics, and the layout with the best (e.g., lowest) weighted score is the layout to which the content is mapped.

Figure 9:
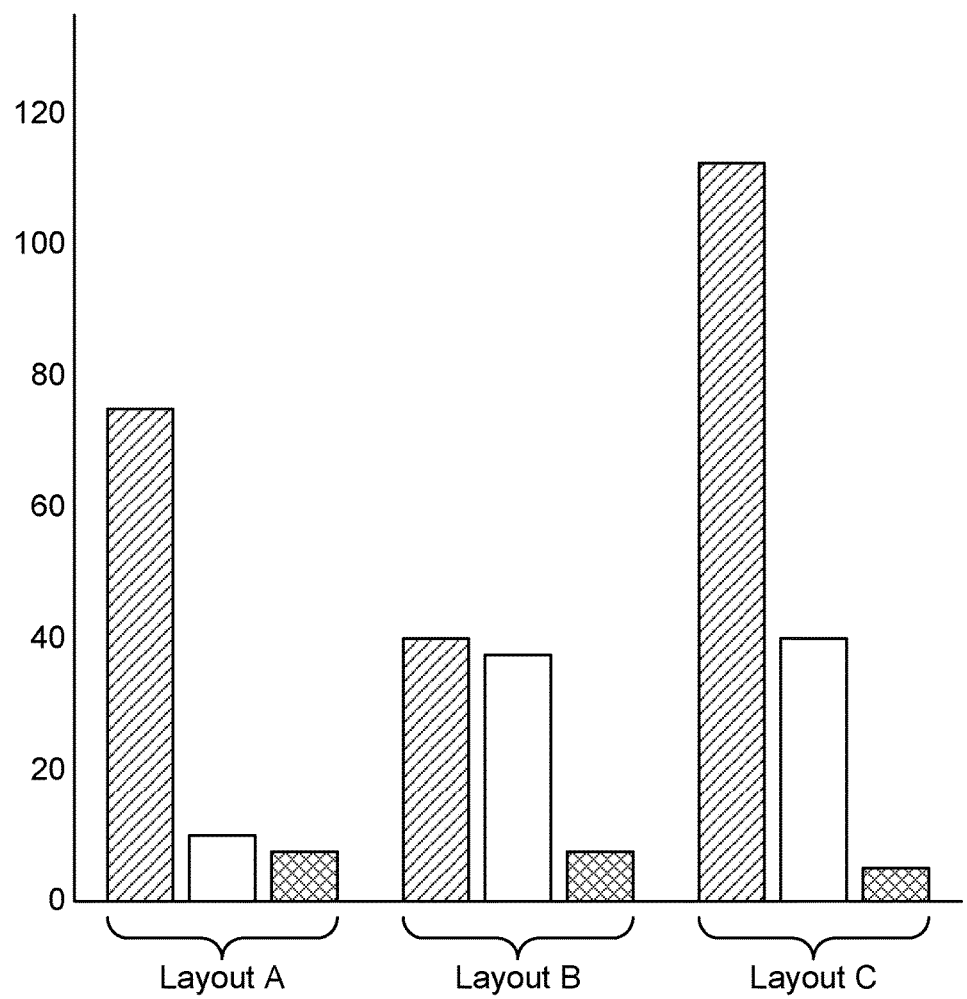
FIG. 9 illustrates an example graph illustrating the use of multiple different metrics measuring different aspects of content distribution for a layout template in accordance with one or more embodiments.

FIG. 9 illustrates an example graph 900 illustrating the use of the multiple different metrics in accordance with one or more embodiments. The graph 900 includes metric values of the mapping cost metric, the unmapped loss metric, and the transformation loss metric along the vertical (y) axis. The graph 900 also includes three different layouts along the horizontal (x) axis, shown as layout A, layout B, and layout C. The graph 900 is a bar chart with metric values for the mapping cost metric being shown by bars with diagonal fill, metrics values for the unmapped loss metric being shown by bars with no fill, and metric values for the transformation loss metric being shown by bars with cross-hatching fill. Thus, as can be seen from the graph 900, the metric value for the mapping cost metric of layout A is approximately 75, the metric value for the unmapped loss metric of layout A is approximately 10, and the metric value for the transformation loss metric of layout A is approximately 8.

Looking at the graph 900, it can be seen that if the desire is to have the layout that provides the lowest mapping cost metric (i.e., the layout that best captures the most critical content in the most critical parts of the layout), then layout B should be used. However, if the desire is to have the layout that provides the lowest unmapped loss metric (i.e., the layout having the smallest number of elements to which no content is mapped) then layout A should be used. And, if the desire is to have the layout that provides the lowest transformation cost metric (i.e., the layout having the smallest loss incurred due to transforming the content to the layout), then layout C should be used.

Although particular functionality is discussed herein with reference to particular modules, it should be noted that the functionality of individual modules discussed herein can be separated into multiple modules, and/or at least some functionality of multiple modules can be combined into a single module. Additionally, it should be noted that a particular module discussed herein as performing an action includes that particular module itself performing the action and/or another module invoked or otherwise accessed by that particular module performing the action.

Figure 10:
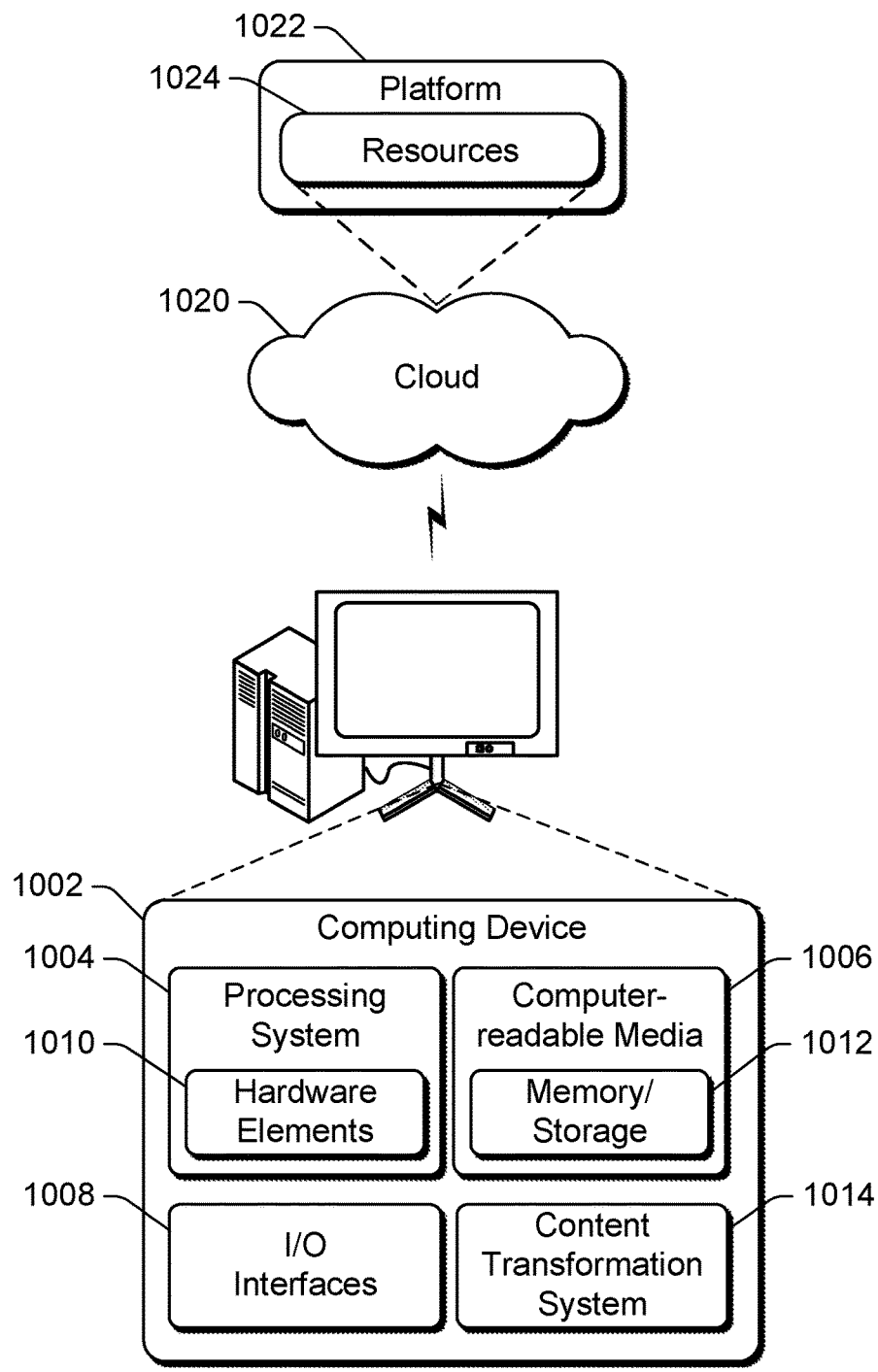
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the content transformation system 1014, which in one or more embodiments is the content transformation system 100 of FIG. 1.

The example computing device 1002 as illustrated includes a processing system 1004, one or more computer-readable media 1006, and one or more I/O interfaces 1008 that are communicatively coupled, one to another. Although not shown, computing device 1002 may further include a system bus or other data and command transfer system that couples the various components, one to another.

Processing system 1004 is representative of functionality to perform one or more operations using hardware. Accordingly, processing system 1004 is illustrated as including hardware elements 1010 that may be configured as processors, functional blocks, and so forth. Hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Hardware may include components of an integrated circuit or on-chip system, an application-specific integrated circuit (ASIC), a field-programmable gate array (FPGA), a complex programmable logic device (CPLD), and so forth. In this context, hardware may operate as a processing device that performs program tasks defined by instructions and/or logic embodied by the hardware as well as a hardware utilized to store instructions for execution.

Computer-readable storage media 1006 is illustrated as including memory/storage 1012. Memory/storage 1012 represents memory/storage capacity associated with one or more computer-readable media. Memory/storage component 1012 may include volatile media (such as random access memory (RAM)) and/or nonvolatile media (such as read only memory (ROM), Flash memory, optical discs, magnetic disks, and so forth). Memory/storage component 1012 may include fixed media as well as removable media. Computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera, and so forth. Examples of output devices include a display device (e.g., a monitor or projector), speakers, a printer, a network card, tactile-response device, and so forth.

Various techniques may be described herein in the general context of software, hardware elements, or modules. The terms "module," "functionality," and "component" as used herein generally represent software, firmware, hardware, or a combination thereof.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices. Examples of computer-readable storage media may include, but are not limited to, RAM, ROM, EEPROM, flash memory or other memory technology, magnetic disks, optical discs, and so forth.

"Computer-readable signal media" refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

The techniques described herein may also be implemented all or in part through use of a distributed system, such as over a "cloud" 1020 via a platform 1022. Cloud 1020 includes and/or is representative of a platform 1022 for resources 1024. Platform 1022 abstracts underlying functionality of hardware (e.g., servers) and software resources of cloud 1020. Resources 1024 may include applications and/or data that can be utilized while computer processing is executed on servers that are remote from computing device 1002. Resources 1024 can also include services provided over the Internet and/or through a subscriber network, such as a cellular or Wi-Fi network.

Platform 1022 may abstract resources and functions to connect computing device 1002 with other computing devices. Platform 1022 may also serve to abstract scaling of resources to provide a corresponding level of scale to encountered demand for resources 1024 that are implemented via platform 1022. Accordingly, in an interconnected device embodiment, implementation of functionality described herein may be distributed throughout system 1000. For example, the functionality may be implemented in part on computing device 1002 as well as via platform 1022 that abstracts the functionality of the cloud 1020.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining, by a computing device, content having multiple parts;
    obtaining, by the computing device, a layout template having multiple layout elements;
    mapping, by the computing device, a part of the multiple parts to multiple layout elements;
    creating, by the computing device, multiple edges based on the mapping, each edge of the multiple edges representing a connection between the part and a respective one of the multiple layout elements;
    determining, by the computing device, a total cost for each edge of the multiple edges by weighting a criticality cost and a transformation cost for each respective edge, the critically cost representing an importance of content associated with the edge, the transformation cost representing a transformation of content associated with the edge;
    selecting, by the computing device, an edge from the multiple edges that is associated with a particular layout element of the multiple layout elements based on the total cost for the edge; and
    generating, by the computing device, a content display by porting the part into the particular layout element as indicated by the selected edge.

2. The method as recited in claim 1, wherein the mapping and the selecting are performed for each part of the multiple parts and wherein the generating the content display includes porting a plurality of the multiple parts into a plurality of the multiple layout elements.

3. The method as recited in claim 1, wherein the method further comprises:
    categorizing, by the computing device, each of the multiple parts into one of multiple categories; and
    categorizing, by the computing device, each of the multiple layout elements into one of the multiple categories, wherein the mapping is based on the category associated with the part and at least one of the multiple categories comprises an article category, a menu category, or a title category.

4. The method as recited in claim 1, wherein the total cost of a respective edge indicates how well an associated layout element displays the part.

5. The method as recited in claim 4, wherein the mapping and selecting are performed for a plurality of parts, and the selecting further includes selecting a set of the edges that has a smallest sum of total costs.

6. The method as recited in claim 1, wherein the part is an image and the transformation of content includes transforming the part by resizing the image, cropping the image, or both resizing and cropping the image.

7. The method as recited in claim 1, wherein the part is text and the transformation of content includes transforming the part by summarizing the text.

8. The method as recited in claim 2, the layout template being one of multiple layout templates, the method further comprising:
    repeating, for each additional layout template of the multiple layout templates, the obtaining the layout template, the mapping the part, the selecting the edge, and the generating the content display; and
    selecting one of the multiple layout templates based on how well the parts are distributed among the layout elements of each of the multiple layout templates.

9. The method as recited in claim 8, wherein the selecting one of the multiple layout templates is further based on a loss of content due to porting the respective parts into the respective layout elements.

10. The method as recited in claim 8, the selecting one of the multiple layout templates being based on whether reducing a loss of information is desired, reducing a number of unmapped regions of the layout template is desired, or reducing an effect of content transformation is desired.

11. A content transformation system comprising:
at least one processor;
a layout store in which multiple layout templates are stored, each layout template including multiple layout elements;
a content mapping module that, responsive to execution by the at least one processor, performs operations including:
obtaining one of the multiple layout templates;
mapping a part of the multiple parts to multiple layout elements;
creating multiple edges based on the mapping, each edge of the multiple edges representing a connection between the part and a respective one of the multiple layout elements;
selecting, based on a total cost of each edge, an edge from the multiple edges, the total cost of each respective edge determined by weighting a critically cost and a transformation cost for the edge, the critically cost representing an importance of content associated with the edge, the transformation cost representing a transformation of content associated with the edge; and
generating a content display by porting the part into a particular layout element associated with the selected edge.

12. The content transformation system as recited in claim 11, wherein the content mapping module further performs operations including: for an edge mapping the part to a first layout element, associate the part with a first criticality value, associate the first layout element with a second criticality value, and assign the edge a criticality cost that is an absolute difference in criticality values between the first criticality value and the second criticality value.

13. The content transformation system as recited in claim 11, wherein the content mapping module further performs operations including: for an edge mapping the part to a first layout element, determine a number of child nodes that a content node representing the part has, determine a number of child nodes that a layout node representing the first layout element has, and assign the edge a total cost further based on how many child nodes each of the part has and the first layout has.

14. The content transformation system as recited in claim 11, wherein the mapping is performed for each part of the multiple parts, wherein the selecting is to select a set of edges having a smallest sum of total costs.

15. The content transformation system as recited in claim 11, wherein the mapping is performed for each part of the multiple parts, wherein the multiple parts includes an image and a text, and wherein to generate the content display is to:
transform the image by resizing the image, cropping the image, or both resizing and cropping the image; and
transform the text by summarizing the text.

16. A computing device comprising:
a processor;
a computer-readable storage media having stored thereon multiple instructions that, when executed by the processor, cause the processor to perform acts including:
obtaining content including multiple parts;
obtaining a layout template including multiple layout elements;
categorizing each of the multiple parts into one of multiple categories;
categorizing each of the multiple layout elements into one of the multiple categories;
mapping a part of the multiple parts to multiple layout elements in the category associated with the part;
creating multiple edges based on the mapping, each edge of the multiple edges representing a connection between the part and a respective one of the multiple layout elements in the category associated with the part;
associating a total cost with each edge, the total cost of an edge determined by weighting a criticality cost and a transformation cost, the criticality cost representing an importance of content associated with the edge, the transformation cost representing a transformation of content associated with the edge;
selecting an edge that has a smallest total cost; and
generating a content display by porting the part into the layout element associated with the selected edge.

17. The computing device as recited in claim 16, wherein the part is an image, the transformation including transforming the part by resizing the image, cropping the image, or both resizing and cropping the image.

18. The computing device as recited in claim 16, wherein the part is a text, the transformation including transforming the part by summarizing the text.

19. The computing device as recited in claim 16, the layout template being one of multiple layout templates, wherein the mapping and the selecting are performed for each part of the multiple parts and wherein the generating the content display includes porting a plurality of the multiple parts into a plurality of the multiple layout elements, the acts further including:
repeating, for each additional layout template of the multiple layout templates, the obtaining the layout template, the categorizing each of the multiple layout elements, the mapping the part, the associating a total cost with each edge, the selecting an edge, and the generating the content display; and
selecting one of the multiple layout templates based on how well the parts are distributed among the layout elements of each of the multiple layout templates.

20. The computing device as recited in claim 19, the selecting one of the multiple layout templates being based on whether reducing a loss of information is desired, reducing a number of unmapped regions of the layout template is desired, or reducing an effect of content transformation is desired.

* * * * *

UNITED STATES PATENT AND TRADEMARK OFFICE
CERTIFICATE OF CORRECTION

PATENT NO. : 10,521,494 B2
APPLICATION NO. : 15/013809
DATED : December 31, 2019
INVENTOR(S) : Balaji Vasan Srinivasan et al.

Page 1 of 1

It is certified that error appears in the above-identified patent and that said Letters Patent is hereby corrected as shown below:

Column 30, Line 12, after "the", delete "critically", insert -- criticality --, therefor.

Column 31, Line 21, after "a", delete "critically", insert -- criticality --, therefor.

Column 31, Line 23, delete "critically", insert -- criticality --, therefor.

Signed and Sealed this
Tenth Day of March, 2020

Andrei Iancu
*Director of the United States Patent and Trademark Office*